US006623074B2

(12) United States Patent
Asbach et al.

(10) Patent No.: US 6,623,074 B2
(45) Date of Patent: Sep. 23, 2003

(54) VEHICLE SEAT

(75) Inventors: Ronald M. Asbach, Grand Island, NY (US); David M. Bapst, South Wales, NY (US); John F. Rhein, Hamburg, NY (US)

(73) Assignee: Mattel, Inc., El Segundo, CA (US)

( * ) Notice: Subject to any disclaimer, the term of this patent is extended or adjusted under 35 U.S.C. 154(b) by 2 days.

(21) Appl. No.: 09/826,011

(22) Filed: Apr. 5, 2001

(65) Prior Publication Data

US 2002/0145318 A1 Oct. 10, 2002

(51) Int. Cl.$^7$ ................................................. B60N 2/28
(52) U.S. Cl. ........................ 297/250.1; 297/284.9; 297/484
(58) Field of Search ....................... 297/250.1, 484, 297/219.12, 284.1, 284.9

(56) References Cited

U.S. PATENT DOCUMENTS

| | | | | |
|---|---|---|---|---|
| 4,854,639 A | * | 8/1989 | Burleigh et al. | 297/250.1 |
| 5,645,317 A | * | 7/1997 | Onishi et al. | 297/250.1 |
| 5,938,284 A | * | 8/1999 | Coffield | 297/284.9 |
| 6,030,047 A | * | 2/2000 | Kain | 297/484 |
| 6,135,553 A | * | 10/2000 | Lovie et al. | 297/250.1 |
| 6,155,638 A | * | 12/2000 | Bapst | 297/250.1 |
| 6,206,470 B1 | * | 3/2001 | Baloga et al. | 297/250.1 |
| 6,378,950 B1 | * | 4/2002 | Takamizu et al. | 297/484 |
| 6,464,294 B1 | | 10/2002 | Kain | |

FOREIGN PATENT DOCUMENTS

| | | |
|---|---|---|
| EP | 1 084 900 A2 | 3/2001 |
| EP | 1 122 120 A1 | 8/2001 |

* cited by examiner

Primary Examiner—Peter R. Brown
(74) Attorney, Agent, or Firm—Morgan, Lewis & Bockius LLP

(57) ABSTRACT

An adjustable vehicle seat may include an adjustable head support, body support, harness, or any combination thereof. A latching mechanism couples an upper portion of the vehicle seat to a seatback. The latching mechanism provides a mechanical coupling between the upper portion and a seat body. The mechanical coupling permits vertical adjustment of the upper portion, which may be configured to provide an adjustable headrest for the vehicle seat. The upper portion may further include side bolsters and harness guides associated with a attached seat harness and/or an auxiliary seat harness. In this embodiment, the latching mechanism permits simultaneous adjustment of the harness, headrest and side bolsters for accommodating a seat occupant. In the preferred embodiment, the vehicle seat is configured as a child's car seat which may be used as either a forward facing car seat with attached harness or a belt positioning booster seat.

39 Claims, 19 Drawing Sheets

VEHICLE SEAT

BACKGROUND OF THE INVENTION

1. Field of the Invention

The invention relates to a vehicle seat, and more particularly, to a vehicle seat with an adjustable upper seat portion and/or restraint harness.

2. Discussion of the Related Art

Minimum performance standards for vehicle seats have been established to ensure a reasonable degree of safety for a seat occupant. In the case where the vehicle seats are intended for children, the performance standards address the need for providing the child with a seat restraint that is compatible with the child's size. It is therefore often necessary for parents to purchase more than one child restraint to accommodate the growth of the child.

In the context of automobile seats, the more common variety of child restraint systems are referred to as add-on child restraints. This variety of child restraint includes a seat body that is secured to the vehicle-supplied seat by either a vehicle lap belt or a combination vehicle lap and shoulder belt. In recent years, a universal restraint system has been adopted. The universal restraint system refers to a restraint system whereby the seat body is secured directly to vehicle supplied anchorage points located along the seat bight (i.e., the intersection between the seat pan and upper seatback) and rear parcel shelf.

Two classes of the "add-on" variety of child restraints are referred to as forward (or rearward) facing car seats with attached harness and belt-positioning booster seats. Car seats with an attached harness have an independently adjustable harness secured to the seat body. A belt positioning booster seat refers to a child restraint that uses the vehicle supplied shoulder and lap belt for restraining the child in the seat.

Existing add-on child restraints will typically include devices for adjusting the vehicle belt restraint and/or attached harness size to accommodate a child's size. These restraint systems may also include separate support cushions for the head, neck and/or side torso which help to support the smaller child passenger. However, the support cushions must be independently adjusted relative to the seat and/or restraining harness. As a result, the various supporting portions of a child restraint which require adjustment to accommodate the size of the child have caused child restraint use to become unnecessarily complicated.

As a result of these and other drawbacks and limitations in vehicle seats, there exists a need for a vehicle seat that is easily adjustable to accommodate a wide range of passenger sizes.

SUMMARY OF THE INVENTION

The invention satisfies these needs while avoiding the problems and disadvantages in existing vehicle seats by providing a vehicle seat that is easily adjustable to accommodate a wide range of passenger sizes. In one aspect of the invention, there is provided a car seat securable to a vehicle seat by, e.g., a vehicle supplied lap belt. The car seat includes a seat body, body support and cam. The seat body includes an upper seatback defining an upper seating area disposed between left and right forwardly extending side walls. The upper seating area supports the upper torso of a seated passenger. The body support includes left and right sides defining respectively, left and right side supports for the seated passenger. The cam adjusts the left side support relative to said right side support when the body support is vertically repositioned relative to the seat body. The car seat may include an upper seat portion coupled to the body support and may further include a headrest formed with the upper seat portion to provide an adjustable headrest and a pair of left and right slots for vertical adjustment of a pair of shoulder belt restraints. In this latter embodiment, the seat provides a headrest, shoulder belt and left and right body support which are simultaneously adjustable to accommodate a passenger's seating requirements.

In another aspect of the invention, there is provided a method for configuring a vehicle seat from a belt positioning booster seat mode appropriate for restraining an occupant of a first size in a vehicle seat, to an attached harness vehicle seat mode appropriate for restraining an occupant of a second size in a vehicle seat, the method including the steps of securing the occupant harness to the seat body, connecting a body support to the seat body, seating the occupant in the vehicle seat, and adjusting the body support's left lateral support surface relative to the right lateral support surface within one of a first range associated with a first size and a second range associated with the second size by vertically adjusting the body support relative to the seat body.

In another aspect of the invention, there is provided a vehicle seat that is easily convertible to accommodate a wide variety of occupant sizes by providing a user handle for adjusting the headrest for either a booster seat or a forward facing car seat with attached harness, and/or for simultaneous adjustment of a headrest and body support for a forward facing car seat with attached harness.

In another aspect of the invention, there is provided a coupling assembly for a vehicle seat that permits adjustment of an upper seat portion including a headrest. The coupling assembly is configurable between a fixed coupling fixing the upper seat portion relative to the seat body and a movable coupling permitting vertical adjustment of the upper seat portion relative to said seat body. The coupling assembly includes a first connector disposed on the upper seat portion, a second connector disposed on the seatback for engaging the first connector, wherein when the second connector is engaged with the first connector the coupling assembly is configured as the fixed coupling, and a cam for displacing one of the first connector and the second connector relative to the other of the first connector and the second connector so as to configure the coupling assembly from the fixed coupling to the movable coupling.

In another aspect of the invention, there is provided a vehicle seat with increased comfort through easy (ergonomic) adjustment while maintaining efficient force management in all adjustment positions.

In another aspect of the invention, there is provided an adjustable vehicle seat that is particularly well suited as a child restraint system for an automobile passenger seat, but which may also be used in adult seating locations such as amusement park rides.

In another aspect of the invention, there is provided a vehicle seat having a high degree of adjustability for accommodating a range of seat occupants using a minimal number of independently adjusted parts.

In another aspect of the invention, there is provided a vehicle seat adjustment mechanism that promotes proper use of a vehicle seat for a range of passenger sizes.

In another aspect of the invention, there is provided an adjustable child's car seat defining a first range of adjustment positions suitable for the car seat when configured as a forward facing car seat with attached harness, and a second, extended range of adjustment positions suitable for the car seat when configured as a belt positioning booster seat.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The vehicle seat of the invention is preferably implemented as a child's car seat that is configurable as either a forward facing car seat with attached harness or a belt positioning booster seat. Examples of a first, preferred embodiment of the vehicle seat are illustrated in FIGS. 1–15 of the drawings.

Figure 1:
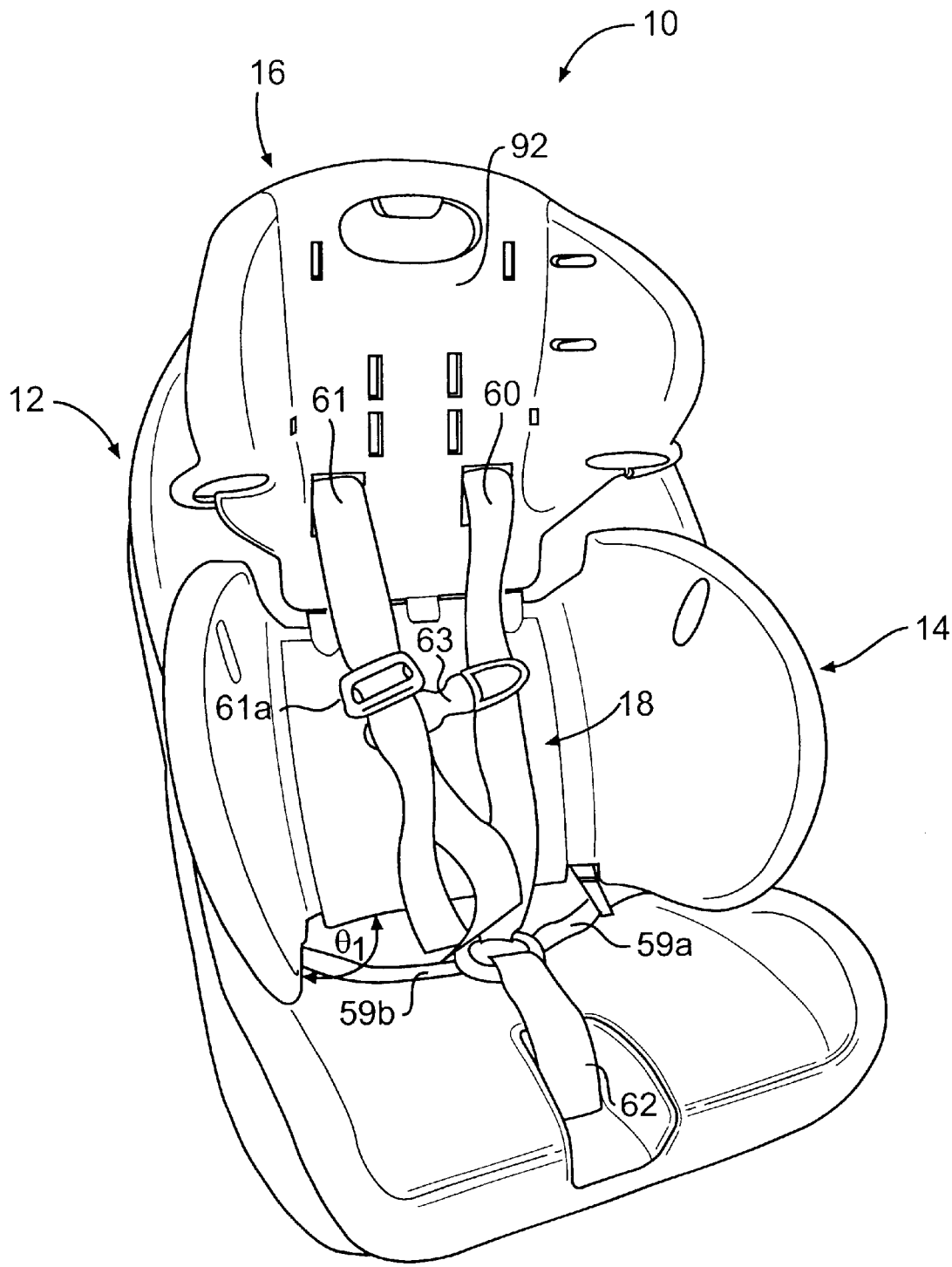
FIG. 1 is a perspective view of a vehicle seat according to a first embodiment of the invention.

FIG. 1 illustrates a car seat 10 including a seat body 12, a body support 14, an upper portion 16 including a headrest 92, and a five-point harness 18. The width of the body support 14 and the height of the upper portion 16 may be simultaneously adjusted to accommodate various occupant sizes by operation of a latching mechanism 124 illustrated in FIGS. 11–15. Car seat 10 is preferably covered with padded soft goods (not shown) in a conventional manner.

Figure 2:
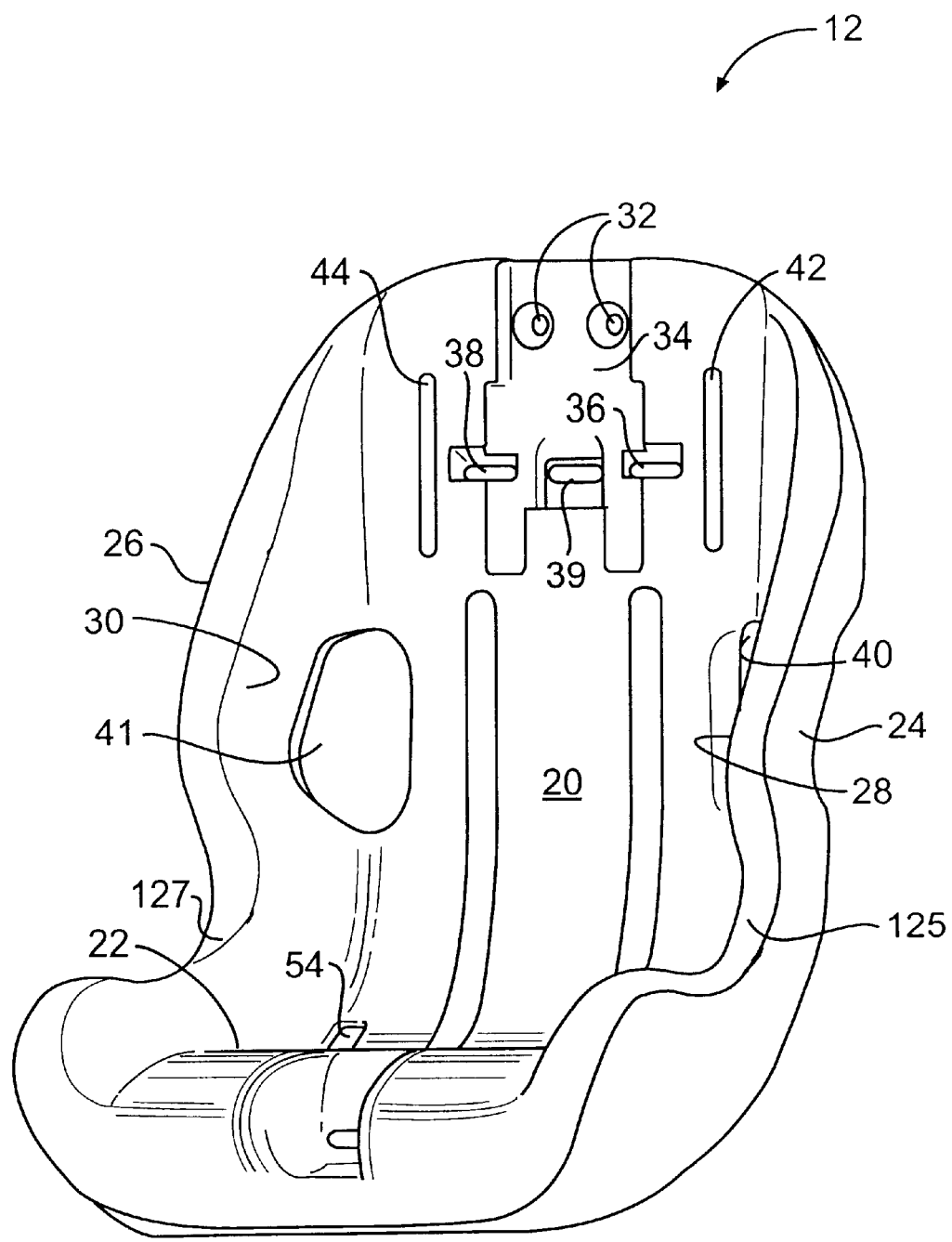
FIG. 2 is a perspective view of a seat body of the vehicle seat of FIG. 1.
Figure 3:
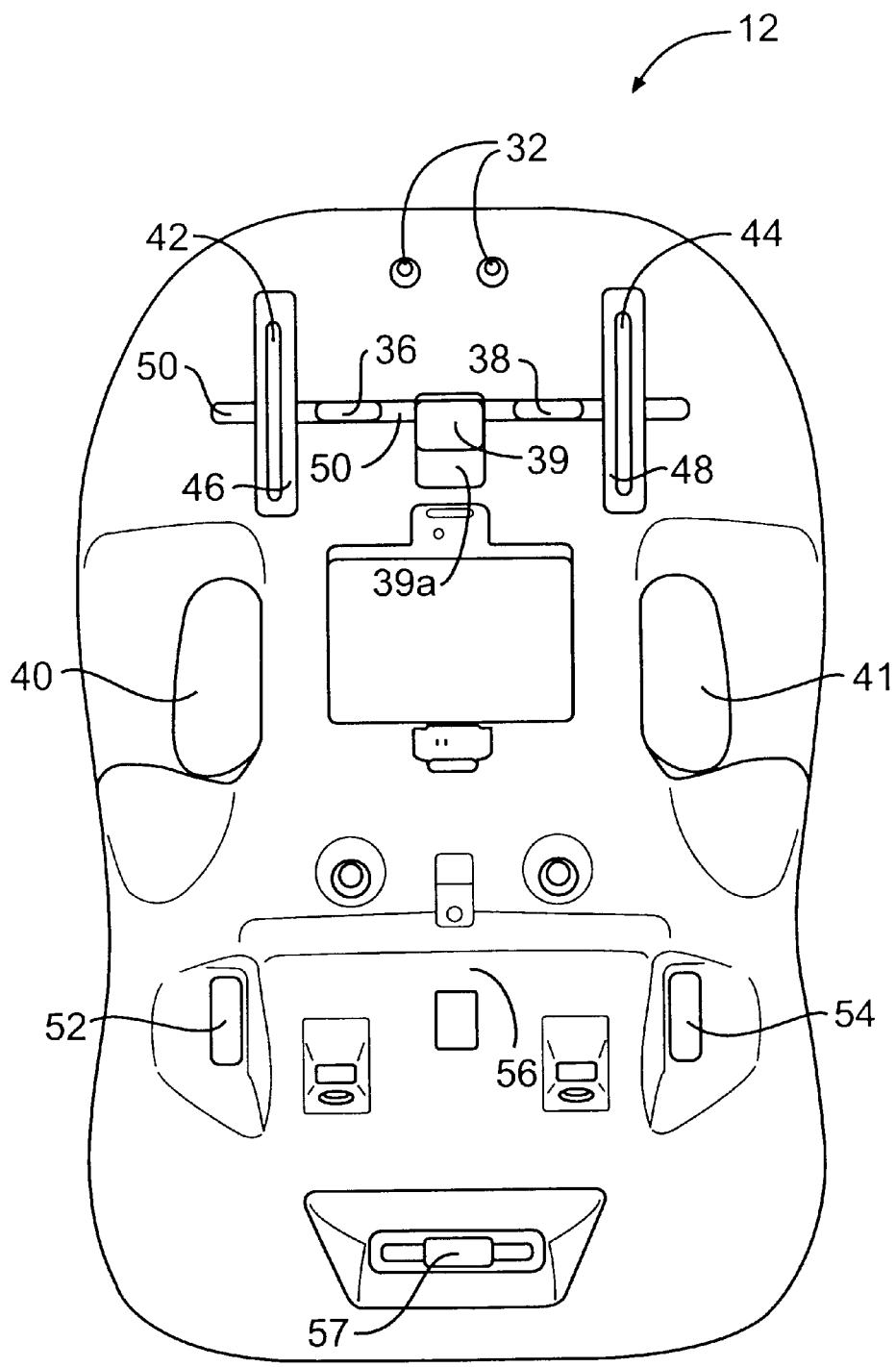
FIG. 3 is a rear view of the seat body of FIG. 2.
Figure 5:
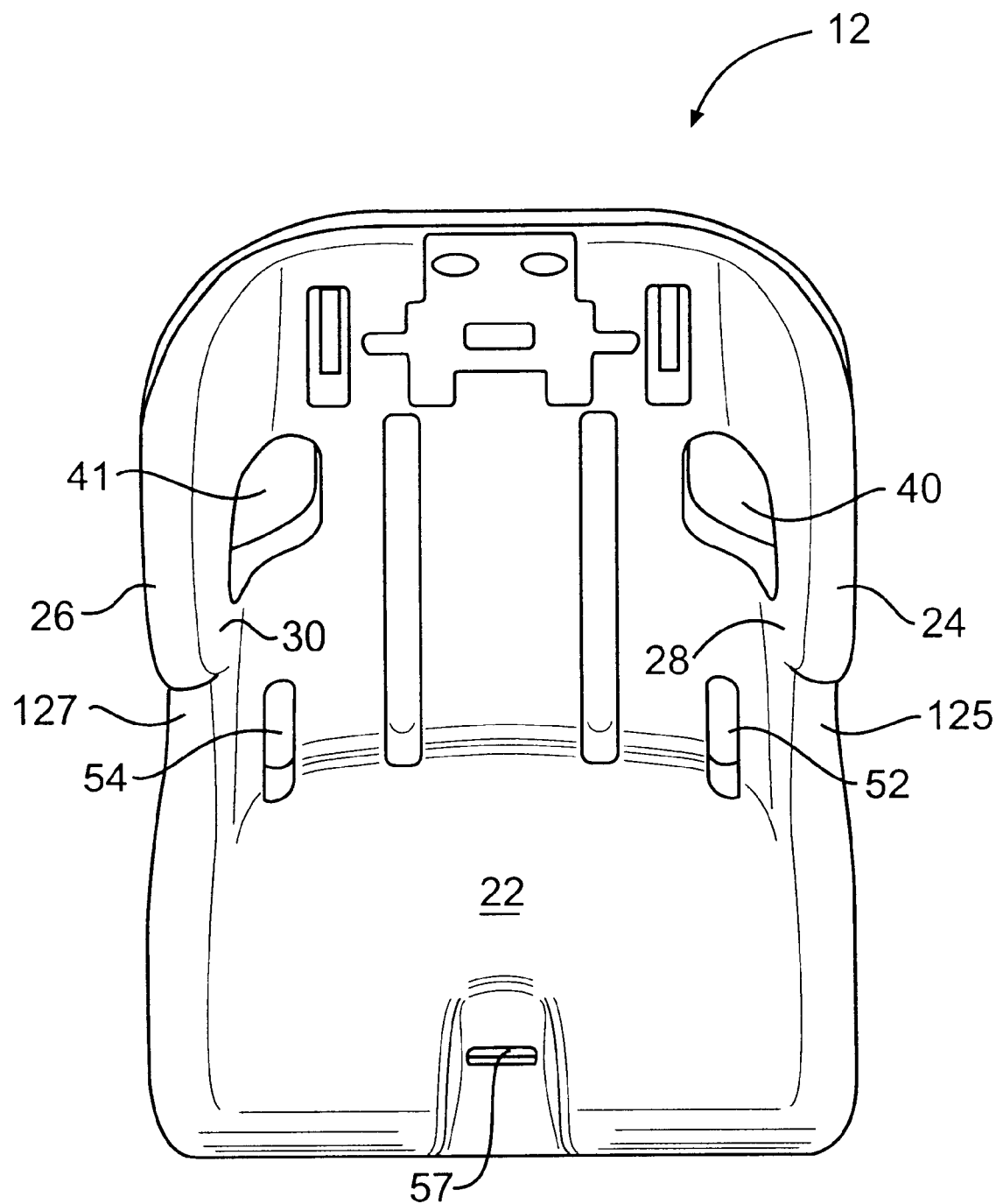
FIG. 5 is a top view of the seat body of FIG. 2.

The seat body 12 is preferably a one-piece blow-molded plastic shell, as shown in FIGS. 2, 3 and 5. However, other conventional materials and conventional manufacturing techniques can be used. The seat body 12 includes a seat back 20 and a seat bottom 22. A side bolster 24, 26 extends from each side of the seat back 20. Each side bolster 24, 26 includes a contoured surface 28, 30.

Figure 4:
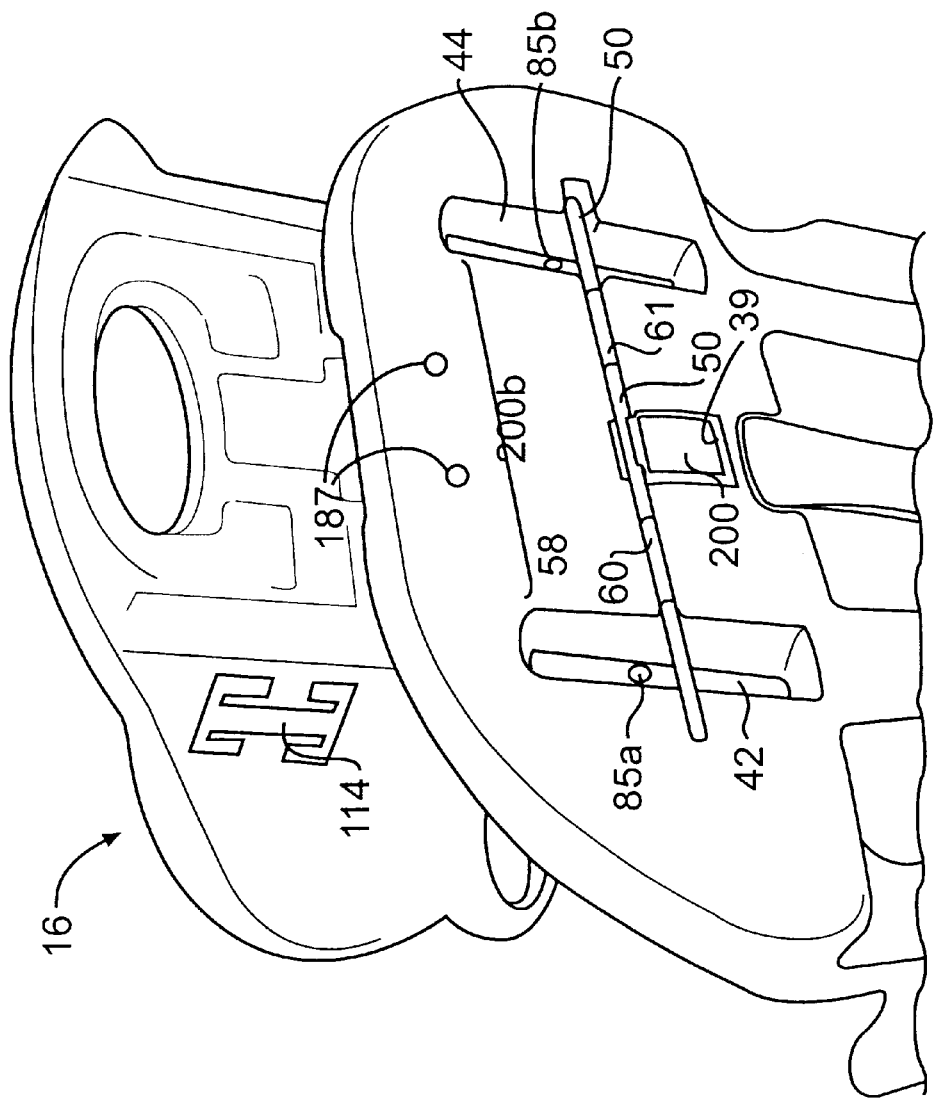
FIG. 4 is a partial rear perspective view of the vehicle seat of FIG. 1.

The preferred harness assembly will now be described with reference to FIG. 1. Five-point harness 18 includes a left and right shoulder harness 60, 61 secured to the rear face of seat back 20, a left and right lap harnesses 59a, 59b and a crotch strap 62. Referring to FIGS. 2 and 4, the ends of left and right shoulder harness 60, 61 are fed through a left and right pair of upper belt slots 36, 38 formed in seat back 20 and secured to a steel rod 58 by e.g., stitching. Steel rod 58 is received in a recess 50 formed on the rear face of seat back 20 and serves as a primary load distribution member for seat occupant loads reacted through left and right shoulder harness 60, 61. Preferably, left shoulder harness 60 and corresponding left and right lap harnesses 59a, 59b are formed from a single, continuous piece of webbing, one end of which is the secured to the steel rod 58. The other end is secured to one portion of a length adjuster 61a. One end of the right shoulder harness 61 is secured to another portion of the length adjuster 61a. The length adjuster 61a permits adjustment of the vertical length of shoulder harness 60, 61 in a conventional manner. The corresponding left and right lap harnesses 59a, 59b are formed by passing the webbing through one of a pair of lower belt slots 52, 54 formed in seat body 12, across a belt ledge 56 extending across the rear face of seat body 12, FIG. 3, and out through the other of the lower belt slots 52, 54. A conventional buckle and tongue assembly releasably secures the left and right shoulder harnesses 60, 61 and lap harnesses 59a, 59b to the crotch strap 62. The end of the crotch strap 62 passes through a center belt slot 57 formed at the forward end of seat body 20 and secured to the seat bottom 22 in a conventional manner. A vertically positionable harness fastener 63 is used to provide a fixed spacing between left and right shoulder harness 60, 61 by engagement of a first portion slidably received on left shoulder harness 61 and a second portion slidably received on right shoulder harness 60.

Figure 6:
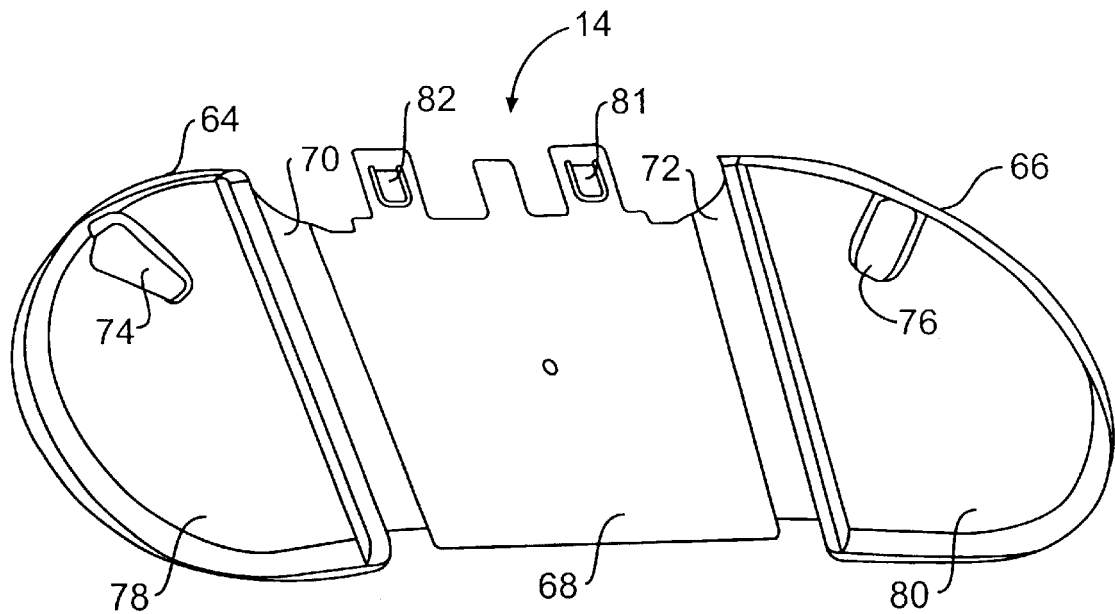
FIG. 6 is a rear perspective view of a body support of the vehicle seat of FIG. 1.

Referring to FIG. 6, body support 14 includes two side supports 64, 66, a central portion 68 and a pair of hinges 70, 72 pivotally connecting the side supports 64, 66 to the central portion 68. This arrangement permits the side supports 64, 66 to pivot toward and away from each other. Preferably, body support 14 is formed from a unitary piece of plastic and hinges 70, 72 are living hinges. Other types of couplings can be used to connect the side supports 64, 66 to the central portion 68, such as pin hinges, multiple-link hinges and ball joints. A protrusion 74, 76 extends from the rear surface 78, 80 of each side support 64, 66. Body support 14 is securable to upper portion 16 by engagement of left and right flexible tabs 81, 82 with corresponding tab slots 88, 90 formed at a lower end 86 of upper portion 16. The flexible tabs 81, 82 and the tab slots 88, 90 are configured to allow a user to easily remove or attach body support 14 to upper portion 16 when desirable.

In operation, body support 14 is adjustable in width to provide a snug side support for the seat occupant's upper torso (i.e., between the waist and neck) as upper portion 16 is raised or lowered. Width adjustment is provided by rotation of side supports 64, 66 about hinges 70, 72 in response to the protrusions 74, 76 riding along the generally downwardly converging contoured surfaces 28, 30 of left and right side bolsters 24, 26. Thus, as body support 14 is raised, side supports 64, 66 rotate outwardly away from each other and when lowered, rotate inwardly and towards each other to provide a width adjustment by vertical adjustment of body support 14. That is, as the upper portion 16 is moved up or down to adjust the position of the headrest 92, the protrusions 74, 76 and the contoured surfaces 28, 30 cam the side supports 64, 66 toward or away from each other, respectively.

Figure 7:
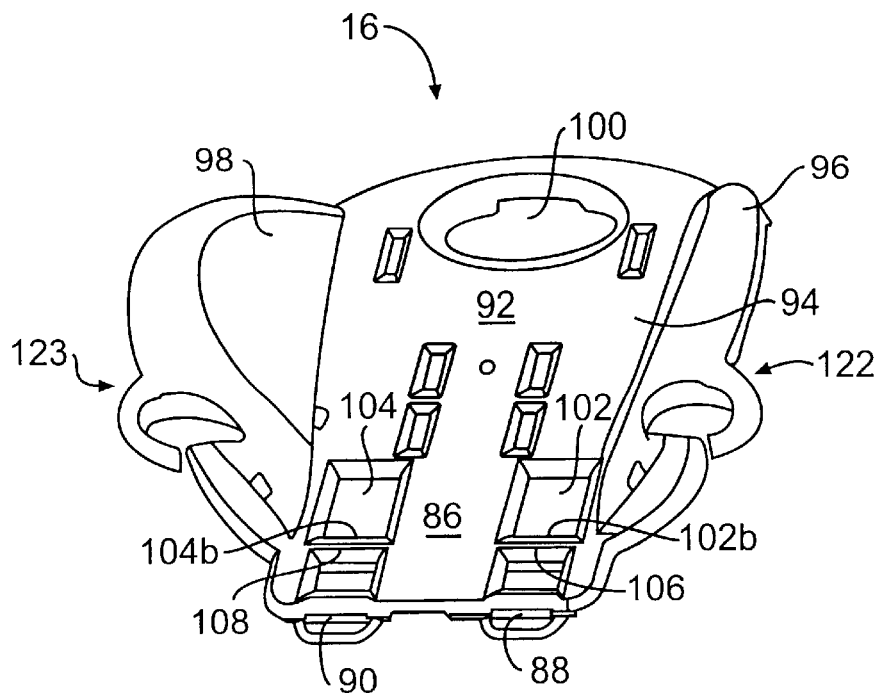
FIG. 7 is a front perspective view of a headrest of the vehicle seat of FIG. 1.

The preferred embodiment of upper portion 16 will now be described with reference to FIGS. 7–8. Upper portion 16 has two sliding posts 83, 84 extending from the rear surface thereof. Each sliding post 83, 84 is received in a respective upper guide slot 42, 44 in the seat back 20, FIGS. 2–4, and 7. A combination washer and screw 85a, 85b, or other suitable fastener, is used to secure each sliding post 83, 84 within a respective vertically extending upper guide slot 42, 44 so as to a provide left and right guide for upper portion 16. Corresponding left and right guide flanges 46, 48, FIG. 3, which define upper guide slots 42, 44, function as bearing surfaces for the washer and screw combinations 85a, 85b as upper portion 16 rides along the guide flange 46, 48 during vertical adjustment of upper portion 16. The washer and screw combinations 85a, 85b interfere with the guide flanges 46, 48 to maintain sliding posts 83, 84 in the vertically extending guide slots 42, 44.

Instead of the washer and screw combinations 85a, 85b, a plastic cap may be snapped into the sliding post. Another embodiment could include a sliding post configured to snap into the guide slot. FIG. 8a schematically illustrates still another embodiment that could include a conventional keyhole-type guide slot (schematically represented at 42a) with a molded conventional head replacing the sliding posts 83, 84. This alternate embodiment preferably could include a conventional travel limiter (schematically represented at 42b) to prevent the molded head member 83a from reaching the assembly opening 42c after assembling the molded head member into the key hole guide slot 42a.

The upper portion 16 includes a headrest 92. The headrest 92 has a main portion 94 and two side extensions 96, 98 defining lateral head supports for the seat occupant. Thus, as upper portion 16 is re-positioned up or down, headrest 92 is vertically repositioned to accommodate the seating height of the seat occupant. A handle opening 100 is centered near the top of the upper portion 16. The handle opening 100 provides a user with a convenient and readily identifiable grasping location for adjusting the upper portion 16 relative to the seat back 20 and/or for transporting car seat 10.

The lower end 86 of the upper portion 16 includes two harness windows 102, 104 defining openings for each of the respective upper ends of shoulder harness 60, 61 with respective positioning ribs 106, 108 for repositioning shoulder harness 61, 60 to accommodate different seated shoulder heights. Referring to FIGS. 1 and 7, when upper portion 16 is coupled to seat body 12, windows 102, 104 may be aligned with respective upper belt slots 36, 38, FIGS. 2 and 3, to define a pathway for insertion of the ends of shoulder harness 61, 60 so that they may be secured to rod 58, as previously discussed. When upper portion 16 is raised or lowered, harness windows 102, 104 are displaced relative to upper belt slots 36, 38. Preferably, windows 102, 104 have an extended height dimension that permits upper portion 16 to be adjusted within a predetermined range without affecting the height position of shoulder harnesses 61, 60.

It is possible to configure the windows 102, 104 such that the upper edge of the windows 102, 104 go below the bottom edge of the upper belt slots 36, 38 when the upper portion 16 is in the lowest position. This configuration allows the windows to be smaller. Smaller windows increase the support area available for the occupant's head as well as promote weight reduction of the seat shell 12.

Upper portion 16 may also be configured to raise the height of shoulder harnesses 61, 60 above the height corresponding to belt slots 36, 38 by displacing a lower wall 102b, 104b of harness windows 102, 104 above belt slots 36, 38 and thereby urging shoulder harness 61, 60 above belt slot 36, 38. However, it is preferred to limit the upper extent of shoulder harness 61, 60 positions in the attached harness mode of car seat 10 according to a maximum predetermined extended length of shoulder harness 61, 60 that will provide an adequate shoulder restraint for the seat occupant, while at the same time allowing upper portion 16 to be raised above this shoulder harness driven height limitation when car seat 10 is configured as a belt positioning booster seat, FIG. 10. To meet this objective, belt slots 36, 38 are preferably placed according to the maximum extended length of shoulder harness 61, 60 appropriate for restraining a seat occupant so that upper walls 102a, 104a of windows 102, 104 will deflect shoulder harnesses 61, 60 downward from the uppermost position (defined by belt slots 36, 38) to lower positions when upper portion 16 is lowered. Upper motion of upper portion 16 is restricted when car seat 10 is configured as an attached harness car seat by forming a pair of rearwardly extending interference tabs 110, 112 formed on lower walls 102b, 104b of upper portion 16, FIG. 8 (it is understood that interference tabs 110, 112 may alternatively be formed on seat back 20.). Interference tabs 110, 112 serve to block upwards motion of upper portion 16 beyond that height where lower walls 102b, 104b are aligned with belt slots 36, 38 by reducing the clearance between upper portion 16 and seat back 20. This clearance will permit lower walls 102b, 104b to move above upper belt slots 36, 38 in the booster seat mode, but will resist such movement when harness 18 is secured to seat body 12. Thus, when shoulder harness 61, 60 ends are secured to seat body 12, there is insufficient clearance between interference tabs 110, 112 and seat back 20 to allow the shoulder harness 61, 60 webbing to clear seat back 20 when the webbing is engaged by lower walls 102b, 104b. Alternative approaches for restricting upwards motion of upper portion 16 may be implemented, depending on particular needs. For example, upwards motion of upper portion 16 may be restricted by a maximum extended webbing length of the harness itself.

Figure 9:
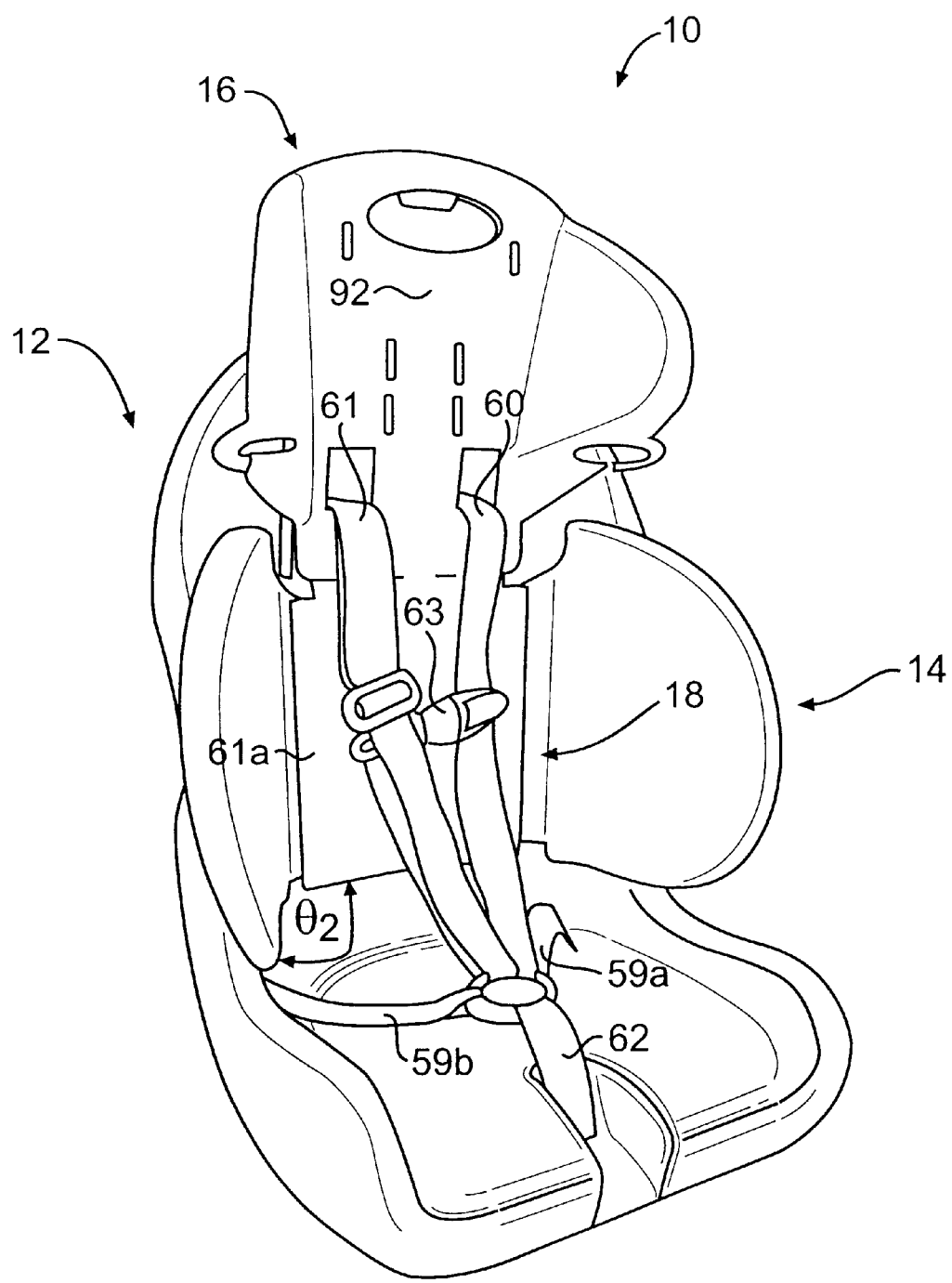
FIG. 9 is a perspective view of the vehicle seat of FIG. 1 in another operative position.

FIG. 1 shows car seat 10 with upper portion 16 positioned in a first, lower position and FIG. 9 shows car seat 10 with upper portion 16 positioned in a second, upper position. The lower position corresponds to a seat configuration appropriate for a first passenger size and the upper position corresponds to larger, second passenger size. As can be seen by comparing the positions of body support 14, headrest 92 and shoulder harness 61, 60 relative to seat body 12 in FIGS. 1 and 9, when upper portion 16 is vertically re-positioned from lower to upper positions, headrest 16, lateral side supports 64, 66 and shoulder harnesses 61, 60 are adjusted accordingly to provide a seating area appropriate for the head and shoulder height and body size of the second passenger size.

As mentioned above, body size adjustment is provided by the side supports 64, 66 rotating about hinges 70, 72. Thus, referring to the orientation of side supports 64, 66 in FIG. 1, a first angle $\theta_1$ is formed between the side supports 64, 66 and the central portion 68 corresponding to the body width of the first passenger, and referring to the orientation of side supports 64, 66 in FIG. 9, a second, larger angle $\theta_2$ is formed between the side supports 64, 66 and central portion 68 corresponding to the larger width associated with the body width of the second passenger.

This preferred arrangement eliminates the need to disconnect the ends of the shoulder harnesses 60, 61 from the seat body 12 and then re-connect them at different heights to accommodate occupants of various sizes. This simplifies daily use of the car seat 10 and promotes proper use of the car seat 10. Additionally, the body portion 14 and the headrest 92 can be simultaneously adjusted by merely displacing the upper portion 16 along the seat back 20.

For larger occupants, it is not necessary to use the five-point harness 18. Accordingly, each side extension 96, 98 has a shoulder belt guide 122, 123 near its lower end. Either of the shoulder belt guides 122, 123 can receive a shoulder belt (not shown) of a vehicle safety belt. The position of the shoulder belt of the vehicle safety belt can be adjusted by moving the upper portion 16 along the upper guide slots 42, 44. The flexibility of the preferred embodiment with respect to using the five-point harness 18 is maintained when using the vehicle safety belt. Furthermore, the adjustment process is identical to that of the five-point harness 18. That is, the upper portion 16 is displaced to simultaneously adjust the position of the body support 14, the headrest 92 and the shoulder belt.

Figure 10:
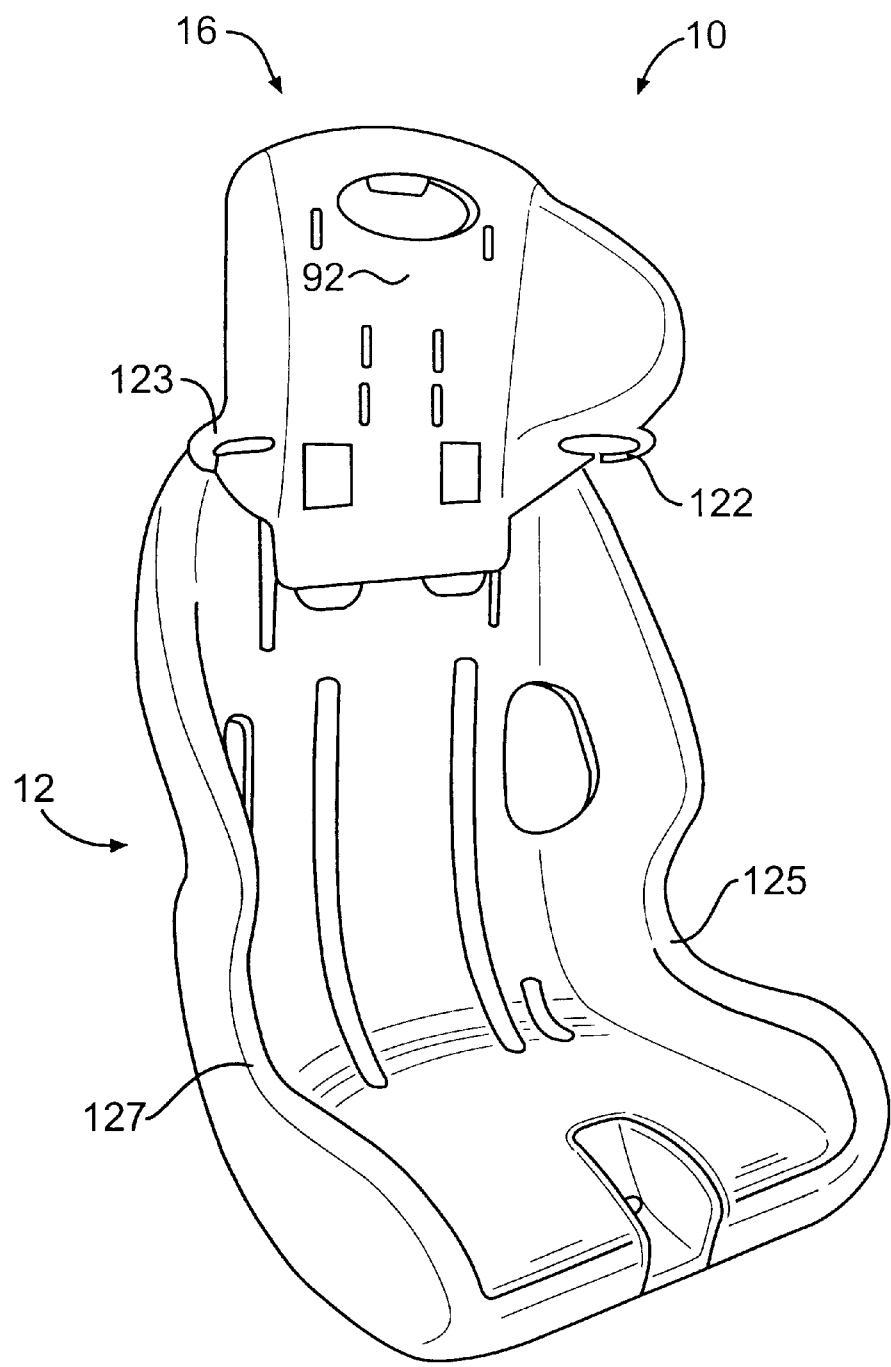
FIG. 10 is a perspective view of the vehicle seat of FIG. 1 with the attached harness removed and the body support removed.

The body support 14 can be removed to accommodate larger occupants, as shown in FIG. 10. In this embodiment, the upper portion simultaneously adjusts the height of the headrest 92 and the shoulder belt.

In the preferred embodiment, the body support 14 moves with the upper portion 16 along the seat body 12. However, the body support 14 may also be separately coupled to the seat body 12 independent of the upper portion 16. In this embodiment, separate guide slots and sliding posts could be provided for the body support 14.

As was mentioned above, car seat 10 may be used in either of two modes: an attached harness mode (FIGS. 1 and 9) and a belt positioning booster seat mode (FIG. 10). In the attached harness mode, the five-point harness 18 is used to secure the occupant to the car seat 10 and the vehicle safety belt (not shown) is used to secure the car seat 10 to the vehicle. In the booster seat mode, the five-point harness 18 and body support 14 are removed from the car seat 10 and both the occupant and the car seat 10 are secured to the vehicle by the vehicle safety belt.

When configured in the booster seat mode, FIG. 10, the shoulder belt of the vehicle safety belt is fed through one of the left and right shoulder belt guides 122, 123 (depending on which side of the passenger seat car seat 10 is placed) and the lap belt is positioned to extend over lap belt guides 125, 127 located near the juncture of seat back 20 and seat bottom 22. Shoulder belt guides 122, 123 are formed on upper portion 16 below the respective side extensions 96, 98 so that the vehicle shoulder belt may properly extend across the seat occupant sternum.

Typically, conventional booster seats do not have much side head support because it interferes with proper positioning of the shoulder belt. Locating the shoulder belt guides 122, 123 below the side supports 96, 98 on an adjustable headrest eliminates this interference and the side supports 96, 98 can extend farther forward than conventional booster seats. By forming shoulder belt guides 122, 123 on upper portion 16, car seat 10 provides a shoulder belt guide that is simultaneously adjusted with headrest 92. Thus, upper portion 16 provides simultaneous adjustment of the restraining vehicle shoulder belt and headrest 92 in booster seat mode, and headrest 92 without affecting the 5-point harness assembly 18 in the attached harness mode.

When configured in the attached harness mode, FIGS. 1 and 9, car seat 10 may be secured to a vehicle passenger seat by a vehicle safety belt (not shown). Left and right intermediate belt slots 40, 41, FIGS. 2, 3 and 5, define the entrance and exit points for the vehicle safety belt. When securing car seat 10, the vehicle safety belt is fed through one of intermediate slots 40, 41, passed over the portion of the forward seating surface of seat back 20 disposed between intermediate slots 40, 41, and then fed through the other of intermediate slots 40, 41. The vehicle safety belt may then be secured to the vehicle supplied belt latch (not shown) and tensioned.

Figure 11:
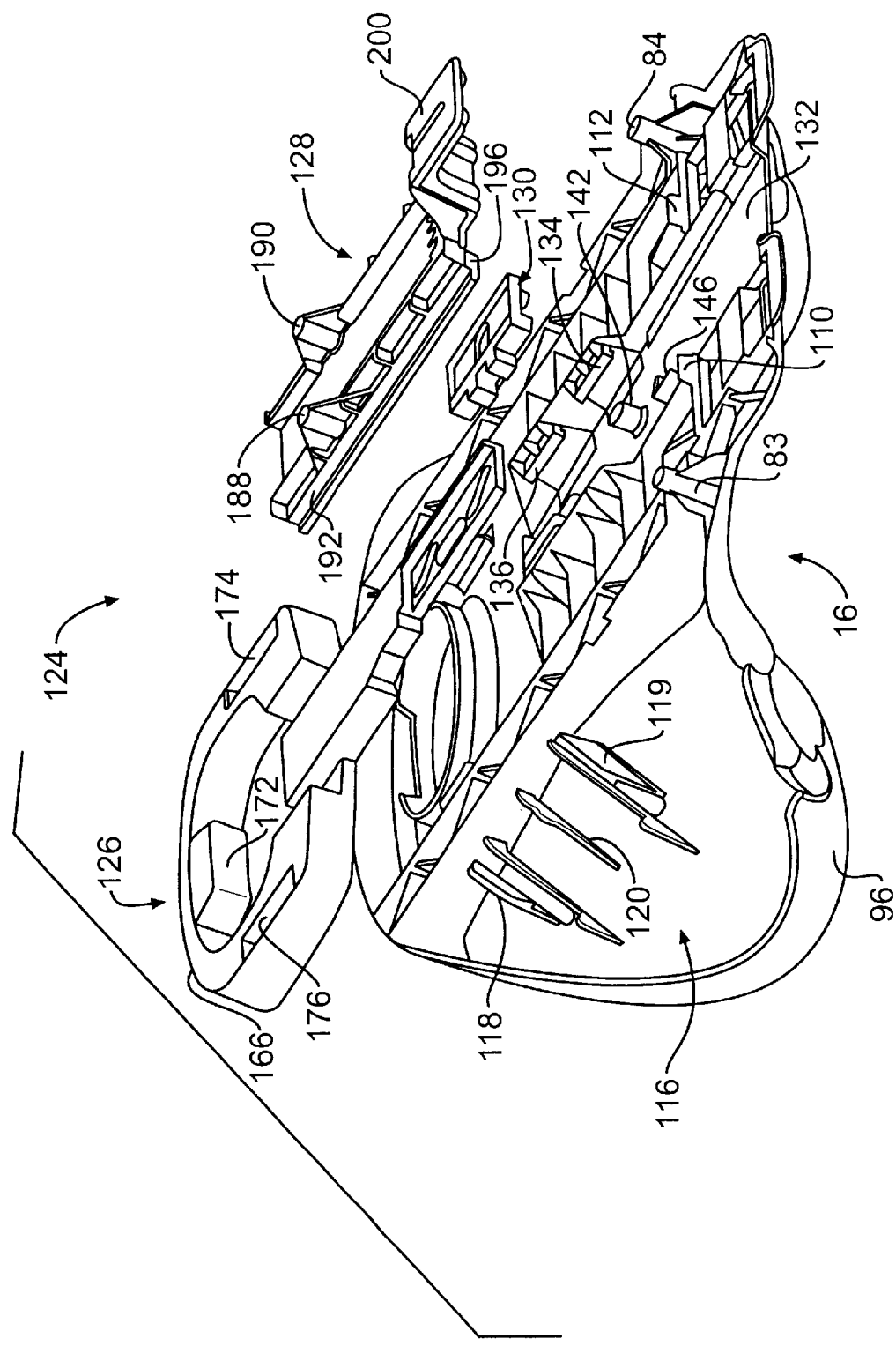
FIG. 11 is an exploded view showing a partial assembly of the headrest and latching mechanism of the vehicle seat in FIG. 1.

For vehicles which provide both a shoulder belt and a lap belt, a lock off clip 114 (FIG. 4) is stored on the rear surface of each side extension 96, 98 for preventing slack from developing in the vehicle lap belt during transit. As shown in FIGS. 4, 8, and 11, a clip storage mount 116 removably attaches the lock off clip 114 to the side extension 96. The clip storage mount 116 includes two mounting brackets 118, 119 and a center flange 120. The lock off clip is snap-fit between the mounting brackets 118, 119. The mounting brackets 118, 119 and the center flange 120 cooperate to store the lock off clip 114 relative to the side extension 96 when the lock off clip 114 is not in use. When the lock off clip 114 is needed, the lock off clip 114 is removed from the clip storage mount 116. The vehicle shoulder belt is threaded through lock off clip 114 after the vehicle shoulder and lap belt are passed through the intermediate belt slot 40, 41 and secured to the vehicle belt latch in the manner described above.

Car seat 10 may also be secured to the vehicle by means of an iso-fix restraint (or latch). In this configuration, a webbing with first and second fastening ends is fed through intermediate slots 40, 41 in the manner described above and secured to vehicle supplied anchor points provided at the seat bight. The fastening ends of the iso-fix restraint may correspond to any suitable latch member that is compatible with the vehicle anchor points. A conventional center tether restraint mount may also be used, and is preferred, to further restrain car seat 10. A center tether (not shown) is desirable as a direct restraint minimizing forward tipping of car seat 10 which may be caused, in large part, by shoulder belt forces applied at the location where shoulder belt 61, 60 ends are secured to seat back 20. In the preferred embodiment, the webbing end associated with the center tether is preferably secured to the center portion of rod 58, FIG. 4, thereby providing an efficient and readily identifiable load path between the vehicle and the car seat 10.

The detailed description of the latching mechanism associated with upper portion 16 will now be discussed with reference to FIGS. 8 and 11–15. Referring to the exploded view of FIG. 11, latching mechanism 124 preferably includes a release handle 126 and lock 130 slidingly coupled to the upper portion 16, and a track 128 secured to the seat back 20. When car seat 10 is in use, engagement of the lock 130 with the track 128 will maintain upper portion 16 at a user-selected height location. When release handle 126 is pulled upwards by the user, lock 130 disengages from track 128 to allow the user to selectively re-position upper portion 16 to accommodate the seat occupant. Thus, latching mechanism 124 provides a user-actuated mechanical coupling between seat back 20 and upper portion 16 for adjusting the height of upper portion 16.

Figure 8:
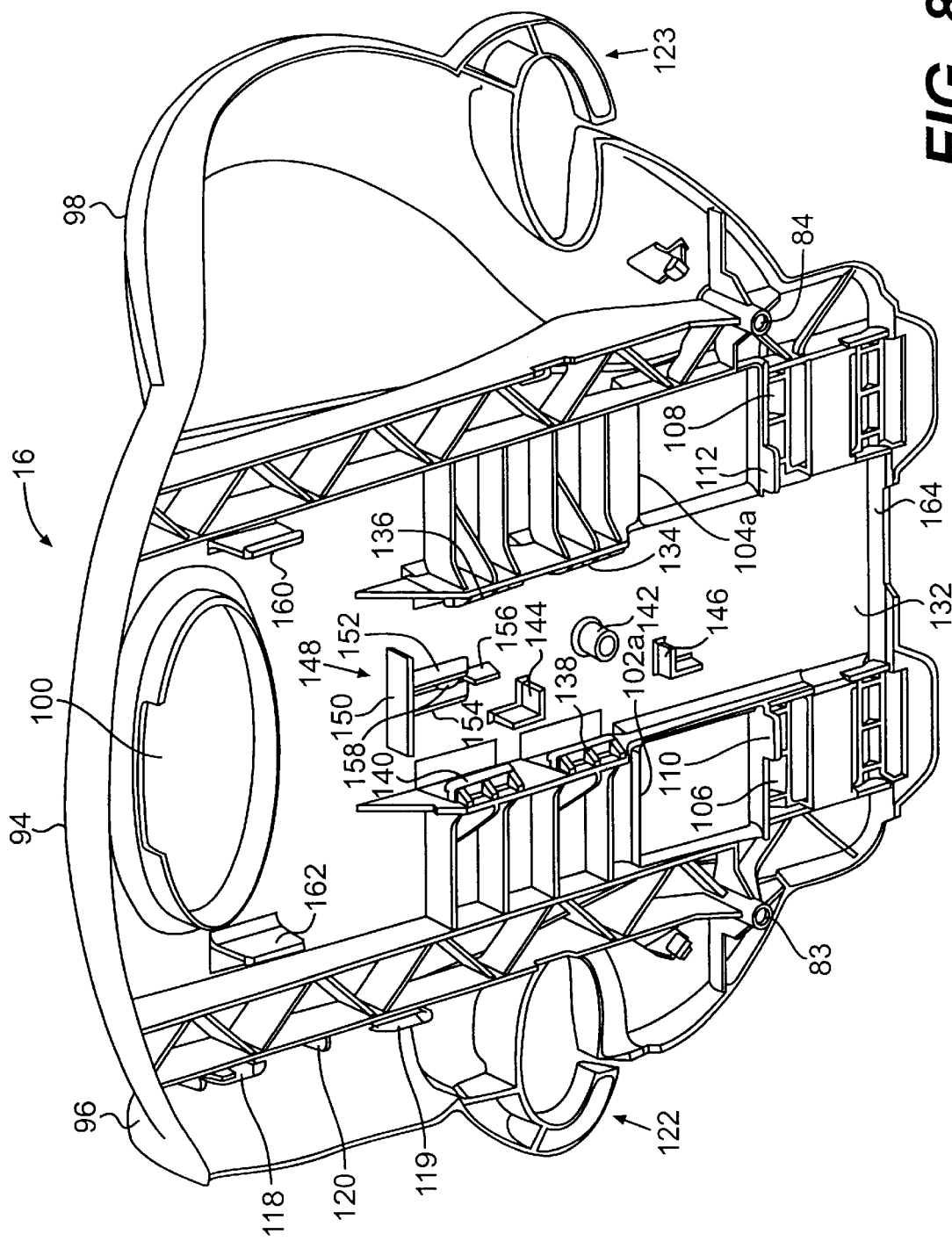
FIG. 8 is a rear perspective view of the headrest of FIG. 7.
Figure 8A:
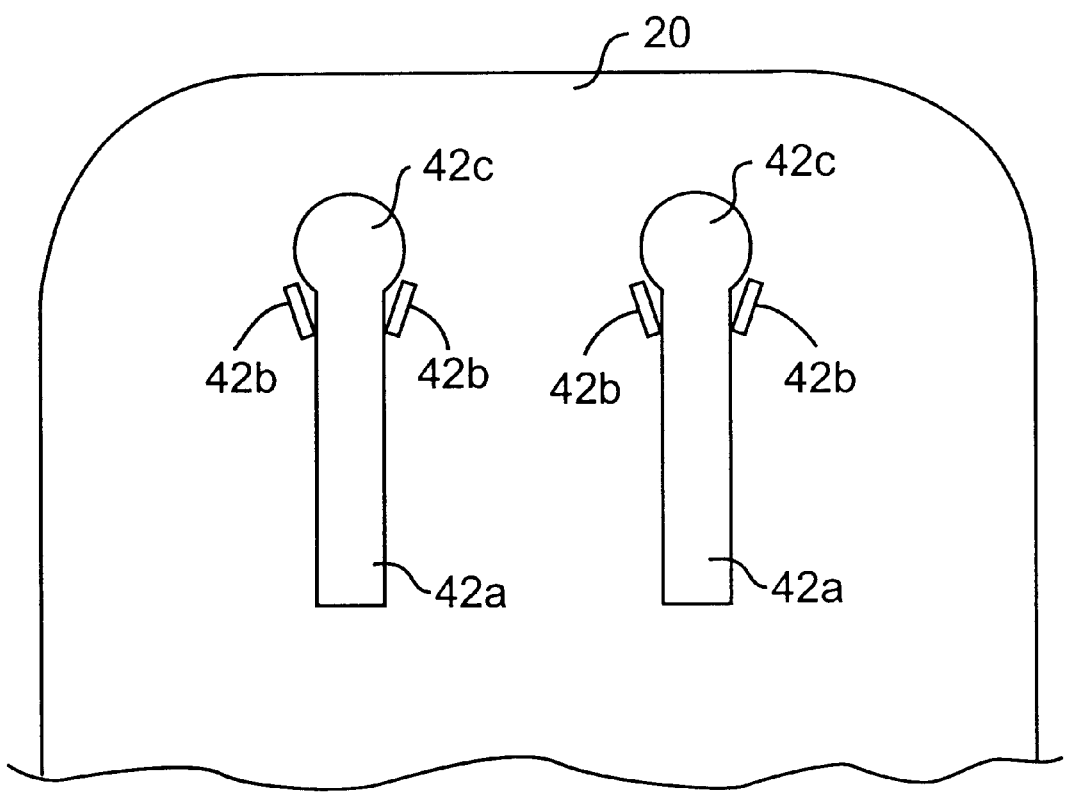
FIG. 8a is a schematic view of an alternate embodiment of an upper guide slot.

Referring to FIG. 8, the upper portion 16 includes a channel 132 extending along the symmetrical axis of the upper portion. Four rail flanges 134, 136, 138, 140 extend inwardly from the edges defining the width of the channel 132. A guide post 142 is centrally located in the channel 132.

An upper guide bracket 144 is positioned in the channel 132 above the guide post 142 and toward the left side rail flanges 138, 140. A lower guide bracket 146 is positioned in the channel 132 below the guide post 142 and aligned with the upper guide bracket 144. A spring housing 148 is located within in the channel 132 along the axis of symmetry of the upper portion 16. The spring housing 148 includes an end wall 150, two side walls 152, 154 and a center guide 156 which define a spring cavity 158 for receiving a compression spring 208, FIG. 15—in phantom. Handle guides 160, 162 extend from the rear surface of the upper portion 16 on each side of the handle opening 100. A bottom wall 164 is formed at the bottom edge of the lower portion 86.

Figure 12:
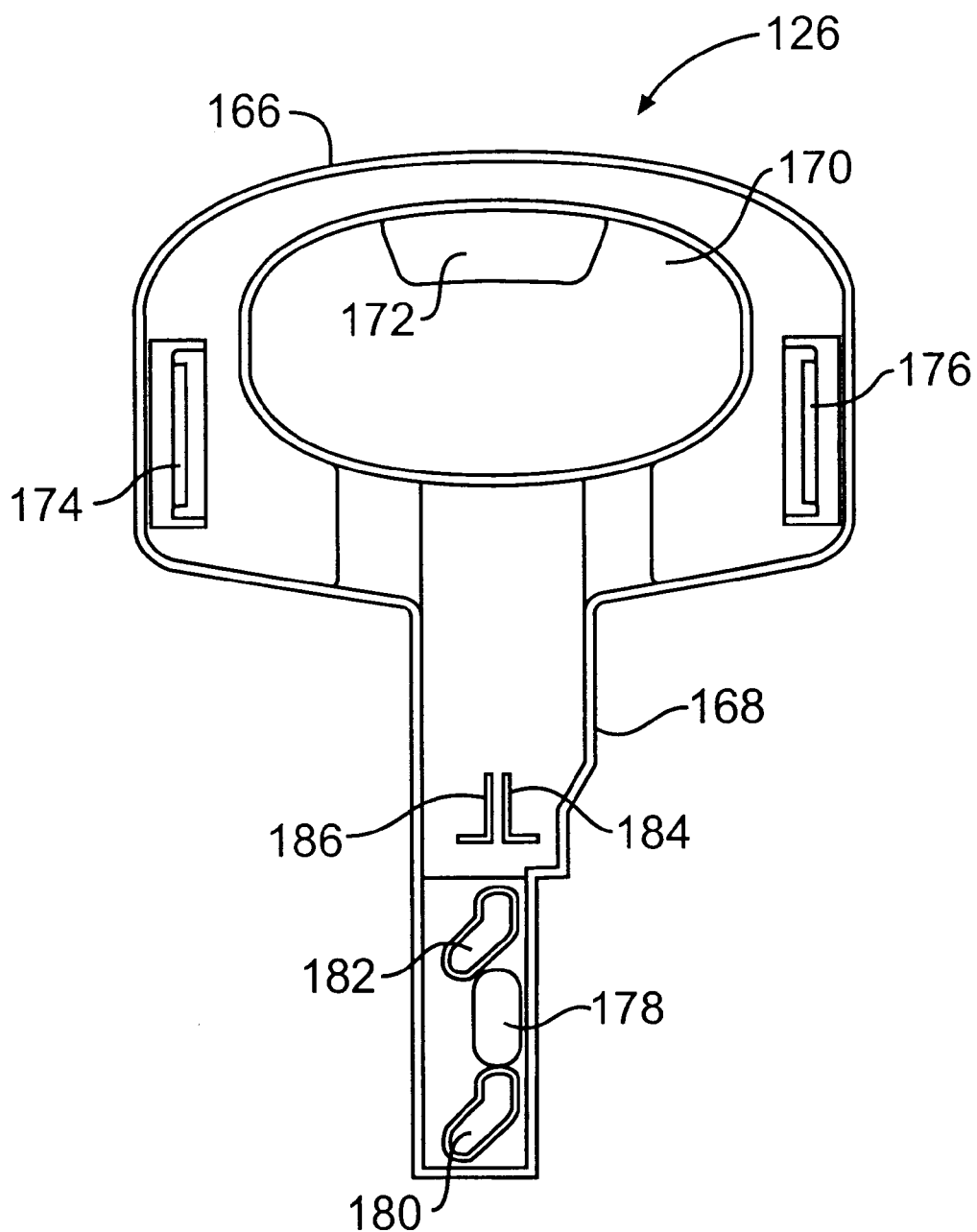
FIG. 12 is a plan view of a release handle of the latching mechanism of FIG. 11.
Figure 15:
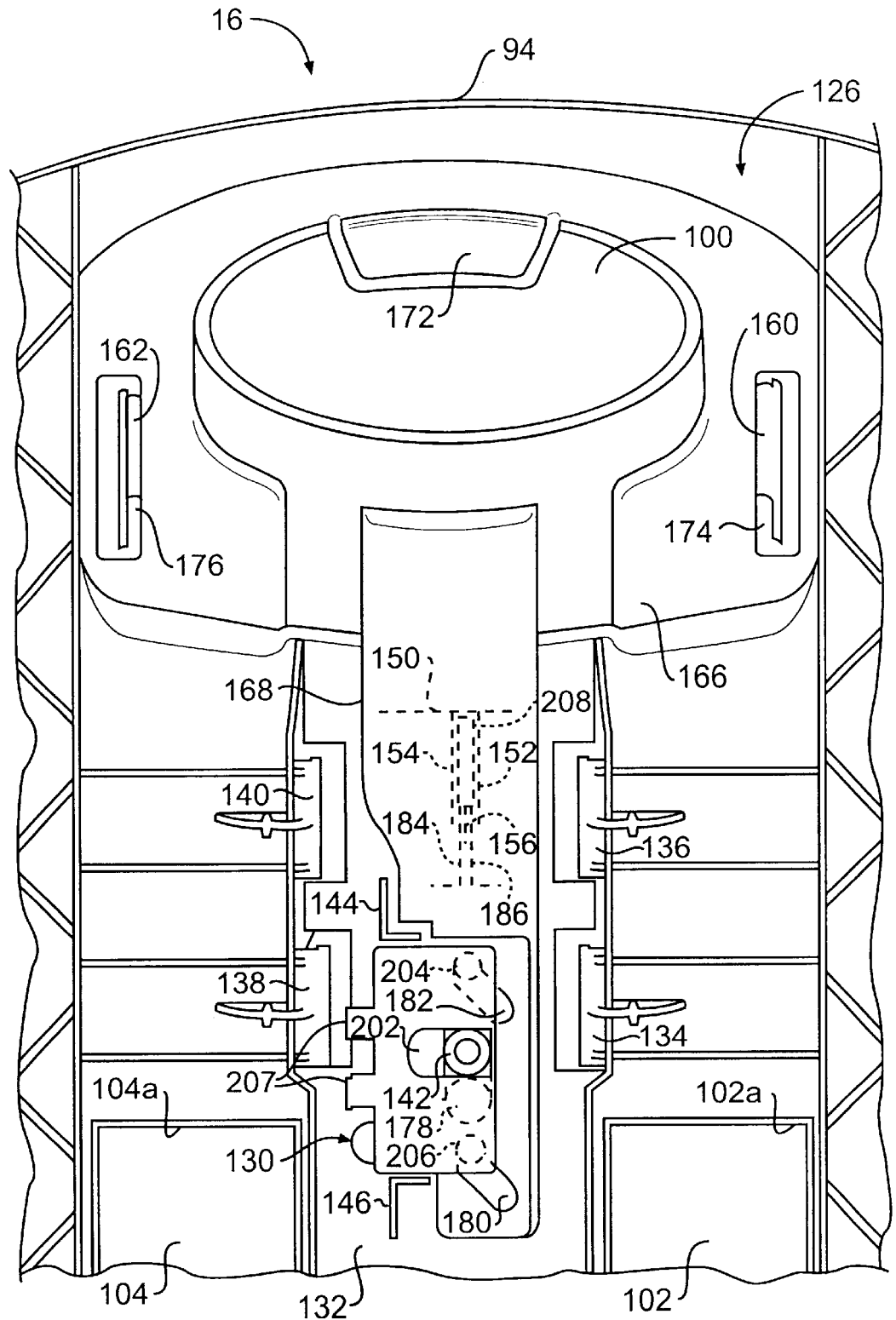
FIG. 15 is a partial rear view of the headrest and latching mechanism of FIG. 11 partially assembled.

Referring to FIGS. 11, 12 and 15, the release handle 126 slides along the channel 132 of the upper portion 16. The release handle 126 includes a head 166 and a stem 168. The head 166 includes an opening 170 that is aligned with the handle opening 100 of upper portion 16, a grip 172 and two handle guide slots 174, 176. Each handle guide slot 174, 176 receives a respective handle guide 160, 162. Each handle guide 160, 162 includes a flexible tab that snaps into the respective guide slot 174, 176. The guide slots 174, 176 cooperate with the handle guides 160, 162 to retain and guide the release handle 126 along the upper portion 16. The stem 168 of the release handle 126 includes a first elongated slot 178, and two translation slots 180, 182. The first elongated slot 178 receives the guide post 142 of the upper portion 16. The first elongated slot 178 defines a vertical range of motion of the release handle 126 relative to the upper portion 168 as the guide post 142 abuts one end or the other of the first elongated slot 178. The stem 168 includes two centrally located spring brackets 184, 186 above the upper translation slot 182. The spring brackets 184, 186 are located on release handle 126 such that spring bracket 184 is disposed between center guide 156 and side wall 152 and spring bracket 186 is disposed between center guide 156 and side wall 154 when release handle is coupled to upper portion 16. This alignment permits spring brackets 184, 186 to pass between the center guide 156 and the respective side wall 152, 154 as the release handle 126 translates up and down along the channel 132.

Figure 13:
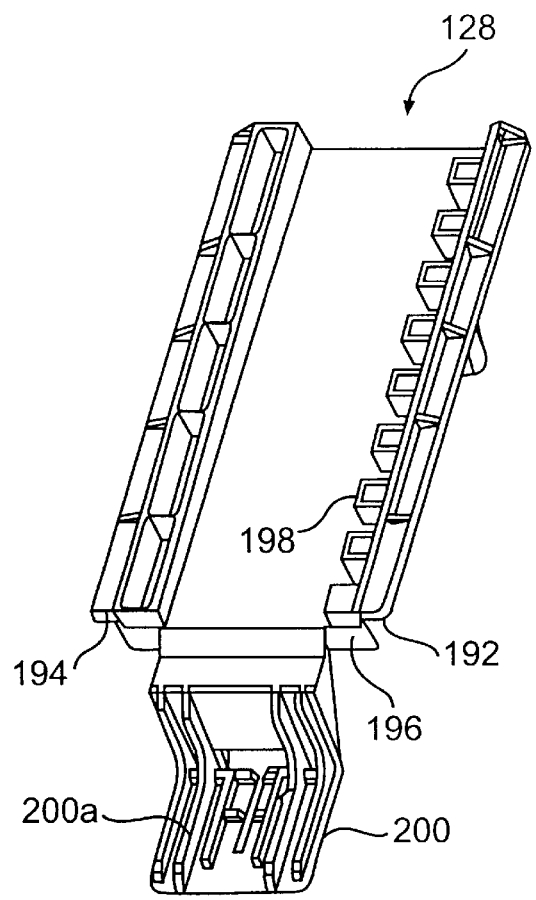
FIG. 13 is a perspective view of a track of the latching mechanism of FIG. 11.
Figure 14:
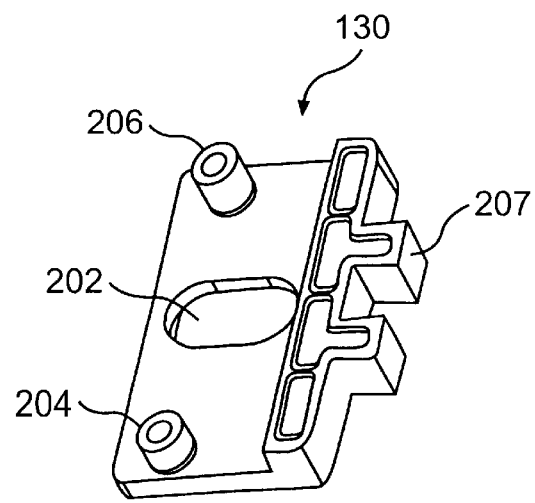
FIG. 14 is perspective view of a lock of the latching mechanism of FIG. 11.

Referring to FIGS. 2, 3, 4 and 13, the track 128 is secured to seat back 20 using fasteners, such as screws 187, which extend through the track mount holes 32 formed on seat back 20 and into fastening posts 188, 190 on the track 128. Rails 192, 194 of the track 128 are received by rail flanges 134, 136, 138 to limit relative motion between track 128 and upper portion 16 to vertical motion corresponding to the vertical re-positioning of upper portion 16 relative to seat back 20. A plurality of teeth 198 extend along rail 192, as shown in FIG. 13, for engagement with corresponding lock teeth 207 formed on lock 130.

Referring to FIGS. 3, 4 and 13, track 128 includes a L-shaped rod bracket 200 which extends through the opening 39 formed in the seat back 20. Rod bracket includes a first abutment surface 200a which is received in a depression 39a formed on the rear face of seat back 20 and an opposing abutment surface 200b that is shaped to assist with retaining rod 58 within recess 50.

Although the track 128 of the preferred embodiment is shown as a separate piece, track 128 may alternatively be formed integrally with the seat back 20. Additionally, the rails 192, 194 could be placed on the upper portion 16 and the rail flanges 132, 134, 136, 138 could be formed on the track 128.

The lock 130 includes a second elongated slot 202, two translation posts 204, 206 and a pair of lock teeth 207. The lock teeth 207 are configured to mate with the teeth 198 of the track 128. The elongated slot 202 receives the guide post 142 of upper portion 16 and translation posts 204, 206 are received in the respective translation slots 180, 182 of release handle 126. The second elongated slot 202 defines a horizontal range of movement of lock 130 relative to upper portion 16 as guide post 142 abuts one end or the other of the second elongated slot 202. This assembly can be best seen in the partial assembled view of latch mechanism 124 of FIG. 15, where the track 128 has been removed for clarity.

When fully assembled, the release handle 126 and the lock 130 are captured between the channel 132 and the track 128. Track 128 is positioned so that teeth 198 are located on the left side of channel 132 in FIG. 15. Lock 130 is received between the upper guide bracket 144 and lower guide bracket 146. The coil spring 208 (shown schematically and in phantom) is received within spring cavity 158. One end of the coil spring 208 abuts the end wall 150 and the other end of the coil spring 208 abuts the center guide 156 and the ends of the spring brackets 184, 186 of release handle 126. This arrangement causes the coil spring 208 to bias the release handle 126 down the channel 132 toward the bottom wall 164 since an upward displacement of release handle 126 will cause spring brackets 184, 186 to extend within spring cavity 158, thereby increasing the biasing force through compression of coil spring 208.

The interaction between translation slots 180, 182 of release handle 126, the translation posts 204, 206 of lock 130, and the biasing force provided by the coupling between release handle 126, spring 208 and end wall 150 of upper portion 16 can be described as a spring biased cam mechanism for releasably engaging lock teeth 207 of lock 130 with mating teeth 198 of track 128 by vertical displacement of release handle 126. When release handle 126 is released, lock 130 will bias towards the left end wall of channel 132, FIG. 15, where teeth 198 of track 128 are located. In this configuration, upper portion 16 is fixed relative to seat body 20. When release handle 126 is lifted upwards, lock 130 will be displaced towards the right in FIG. 15 as the translation posts 204, 206 of lock 130 move along the angularly extending translation slots 180, 182 of release handle 180, 182. In this configuration, lock teeth 207 are clear of teeth 198 and upper portion 16 may be freely re-positioned relative to seat back 20.

The operation of latch mechanism 124 may be described in the following manner. To adjust the position of the upper portion 16 relative to seat back 20, the grip 172 is squeezed, thus drawing the release handle 126 up. The upward displacement of the release handle cams the lock teeth 207 away from the corresponding pair of teeth 198 located on track 128, thereby disengaging the lock teeth 207 from the teeth 198. The upper portion 16 is then free to move up or down along the seat back 20. The grip 172 is released when the upper portion 16 reaches the desired position. When released, the coil spring 208 biases the release handle 126 down. Downward displacement of release handle 126 cams the lock teeth 207 towards a new position of track teeth 198 corresponding to the new position of upper portion 16. Upper portion 16 is then locked relative to seat back 20 in the new position. Thus, the upper portion 16 is fixedly adjustable along seat back 20 between discrete positions defined by the teeth 198.

Alternative embodiments of the cam mechanism described above may be employed without departing from the scope of the invention. One embodiment could include a lock that pivots relative to the track teeth as release handle is displaced up or down. In other embodiments, the coil spring could be configured to bias directly against the lock instead of against the release handle, contoured ramps could be formed on the stem in place of translation slots 180, 182, and/or contoured ramps, translation slots or other similar structure that translates vertical motion of release handle to horizontal motion of a lock can be formed on seat back 20.

Other embodiments for the latching mechanism can include a multiple link assembly instead of the cam and slot to move the lock 130 relative to the track 128, a push button mechanism a ball and detent latch, and a ratchet-type latch. The push button mechanism that can include a centrally pivoted lever with a button at one end and locking teeth at the other end to mate with the teeth secured to the seat back.

The ratchet-type latch could include ramped teeth formed on the seat back and a pawl on the upper portion 16. The pawl can be connected to the handle 126. The ramped teeth could be configured to allow the upper portion to be adjusted upwardly by merely lifting up on the upper portion 16 and adjusted downward by squeezing the handle to release the pawl from the teeth in a known manner.

A second embodiment of the invention will now be described. The second embodiment also refers to a child's car seat that may be configured as either a forward facing car seat with attached harness or a belt positioning booster seat. This embodiment of a car seat also includes a seat body, body support, upper portion and five-point harness, each of which share similar characteristics to the respective components of the first embodiment described above.

Figure 16:
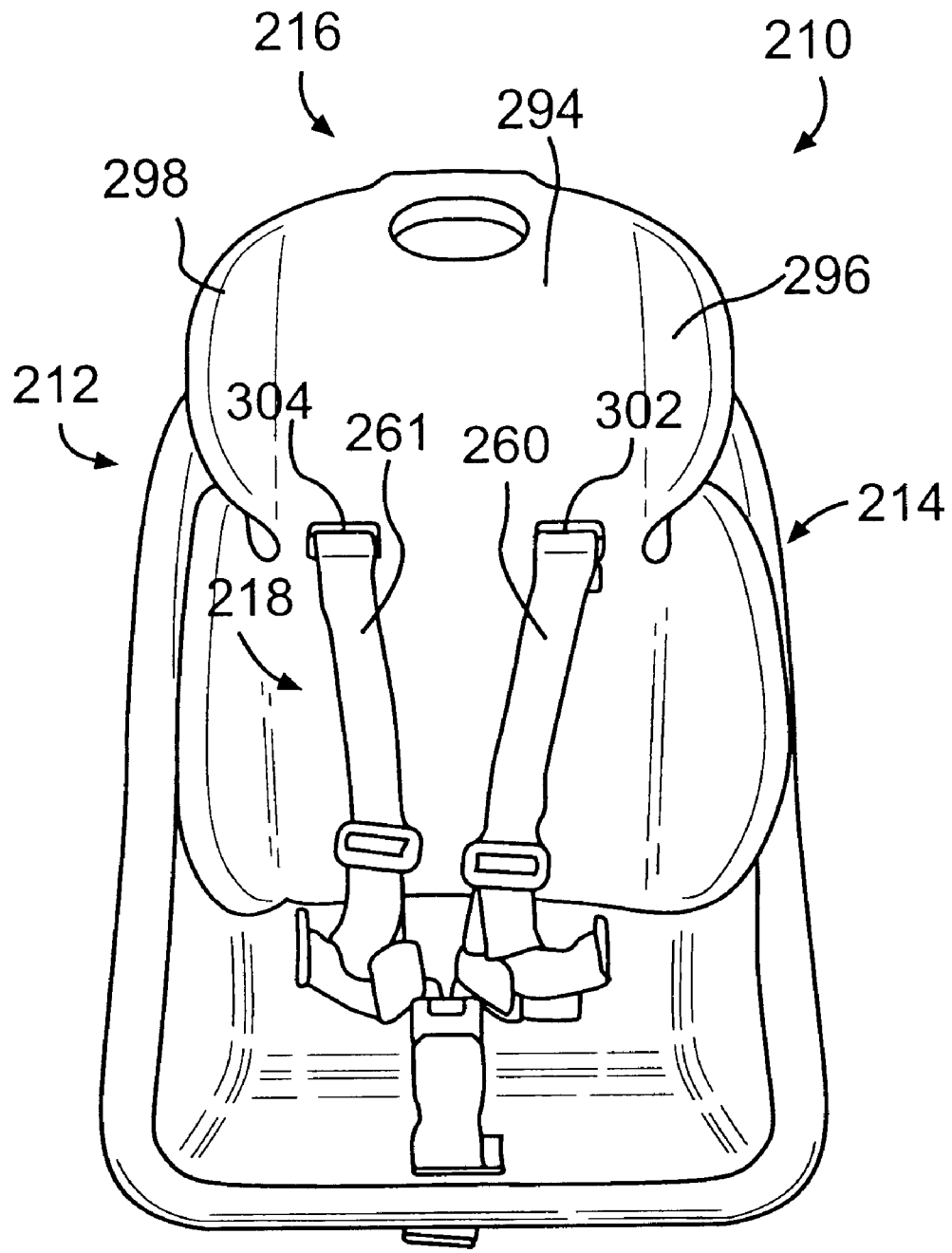
FIG. 16 is a front view of a vehicle seat according to a second embodiment of the invention.
Figure 17:
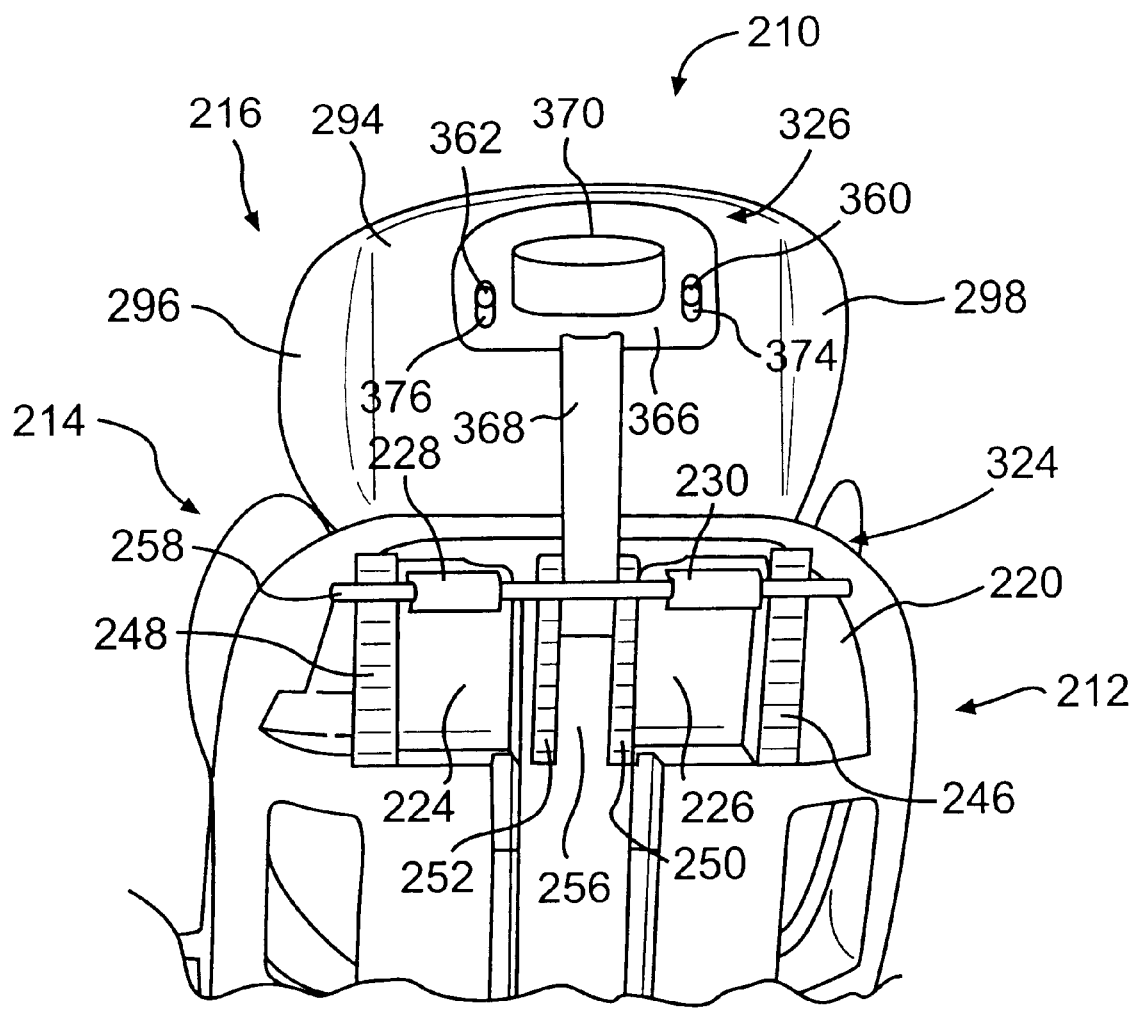
FIG. 17 is a partial rear perspective view of the vehicle seat of FIG. 16.

Referring to front and rear perspective views of a car seat 210 of a second embodiment of the invention of, FIGS. 16–17, respectively, car seat 210 includes a seat body 212 having a seat back 220 and a lower seating portion. An upper portion 216 is adjustably mounted to seat back 220. A five-point harness assembly 218 is mounted to seat body 212. Harness 218 is essentially the same in construction and operation as harness 18 of the first embodiment. A body support 214 is coupled to upper portion 216 at a lower end thereof and may be removably attached to upper portion 216 when configuring between an attached harness mode and booster seat mode (as in the case of the first embodiment). Body support 214 is essentially the same in construction and operation as body support 14 of the first embodiment.

Upper portion 216, body support 214 and harness 218 are adjustable relative to seat body 212 by actuating a latching mechanism 324, FIG. 17, and then lifting or lowering upper portion 216 so as to accommodate the seat occupant. Thus, the second embodiment of the invention is similar to the first embodiment. However, the implementation of an adjustable seating area of the second embodiment differs from that of the first embodiment, as will now be discussed in detail.

Harness 218 includes a left and right lap portion and left and right shoulder harnesses 260, 261 which are releasably securable to a crotch portion by a buckle and tongue fastener. The lap portions and crotch portion are securable to seat body 212 in a similar manner to the first embodiment. The ends of shoulder harnesses 260, 261 are coupled to the rear face of seatback 220 through a steel rod 258 received in left and right rod loops, 228, 230 formed in upper portion 216, as is discussed in greater detail below. Harnesses 260, 261 may be secured to rod 258 in a manner similar to the first embodiment (e.g., by forming loops in the ends and passing the rod between the loops).

Figure 18:
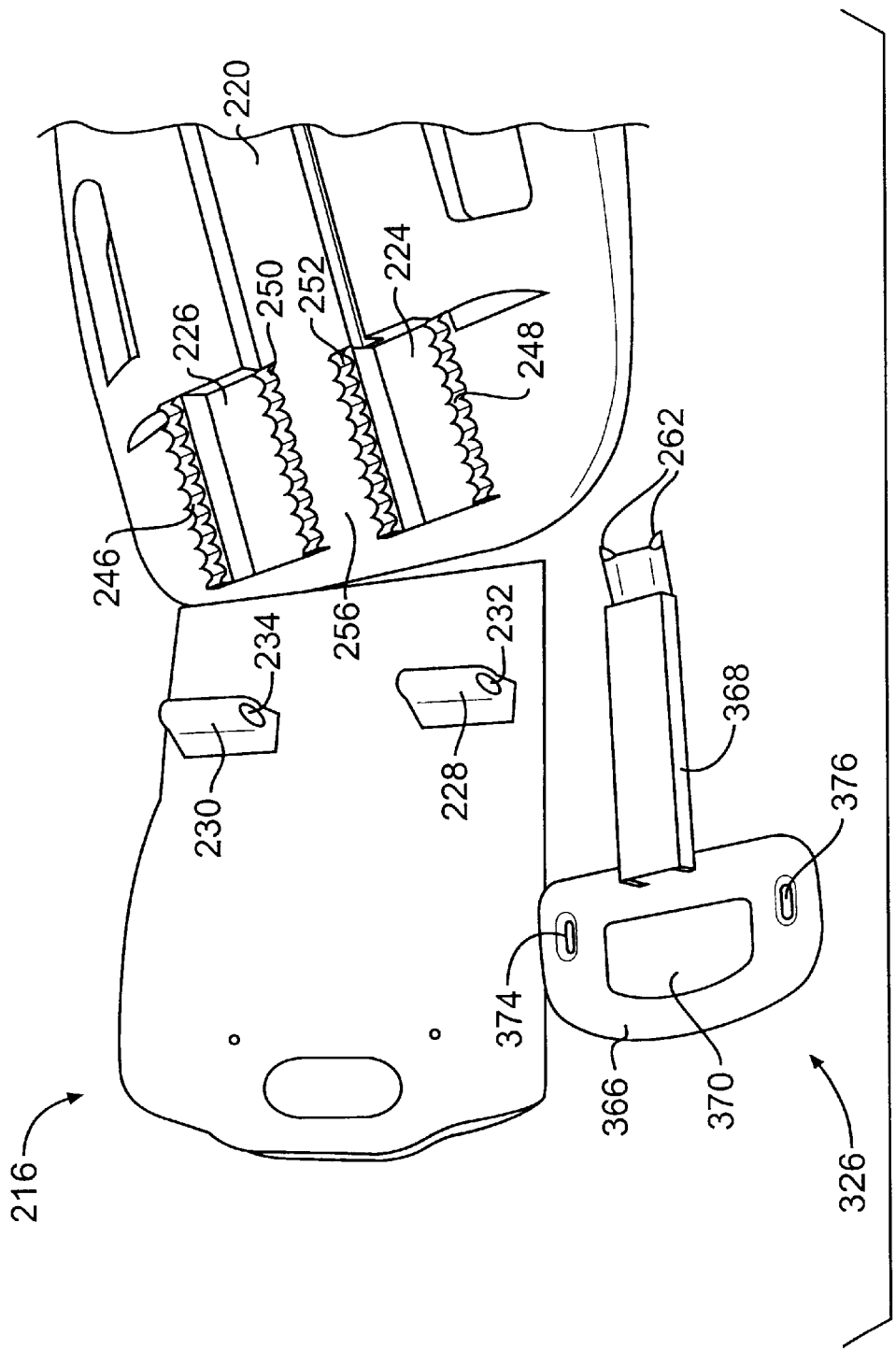
FIG. 18 is an exploded rear view showing a partial assembly of the upper portion with side extensions removed and a latching mechanism of the vehicle seat in FIG. 16.
Figure 19:
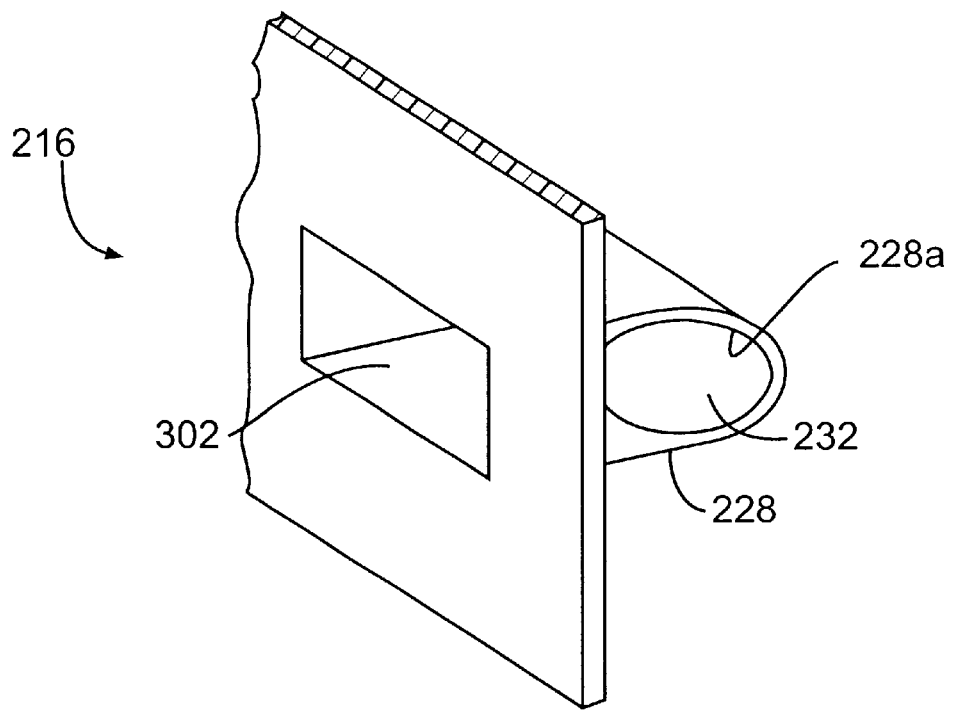
FIG. 19 is an enlarged perspective view of an upper portion of the vehicle seat of FIG. 16.
Figure 20:
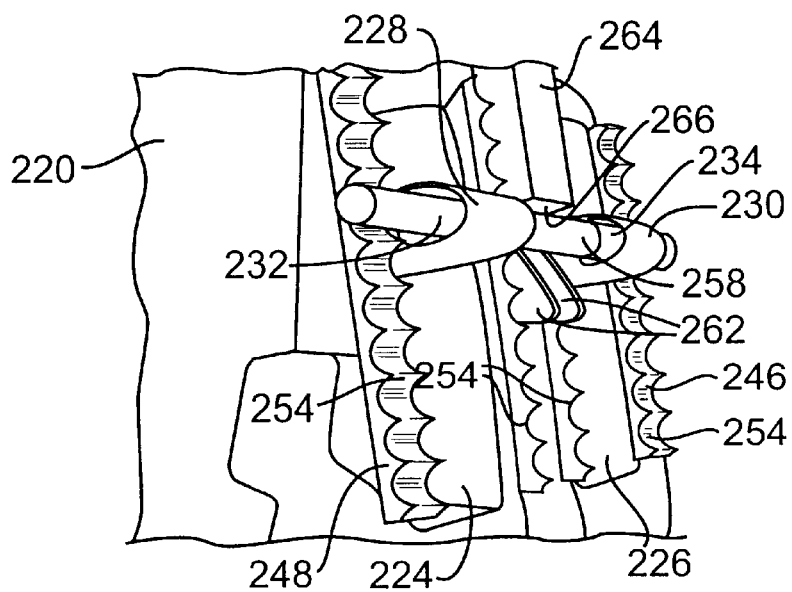
FIG. 20 is an enlarged perspective view of a portion of FIG. 17.

The upper portion 216 includes a main portion 222 and two side extensions 296, 298 on each side of the main portion 294 (the rear perspective view of FIG. 18 shows upper portion 216 with side extensions 296, 298 removed). Referring to the seating side of car seat 210, FIG. 16, main portion 294 defines a headrest 292 and extensions 224, 226 define respective lateral head supports for the seat occupant. The two rod loops 228, 230 extend from the rear surface of the main portion 294 opposite respective belt slots 302, 304, as shown in FIG. 16. When upper portion 216 is positioned on seatback 220, rod loops 228, 230 are received in a pair of left and right vertically extending slots 224, 226 formed on seatback 220. Referring to FIGS. 17, 19 and 20, upper portion 216 is coupled to seat body 212 by positioning rod loops 228, 230 in slots 224, 226 and then extending rod 258 through rod loops 228, 230 so that rod 258 may be received in recesses 254 defined by vertically extending outboard and inboard teeth, 246, 248, 250 and 252 formed on seatback 220, as shown in FIG. 19. Rod 258 is preferably maintained in recesses 254 during car seat use by positioning compression springs (not shown) between rod 258 and each of the inner walls 228a and 230a (not shown) of rod loops 228, 230. Thus, when seat 210 is configured in the attached harness mode, rod 258 serves as both a coupling between shoulder harnesses 260, 261 and seatback 220 and a coupling between upper portion 216 and seatback 220.

The latching mechanism associated with the second embodiment of the invention allows a user to selectively re-position upper portion 216, harness 218 and body support 214 by overcoming the spring bias retaining rod 258 in recesses 254.

A release handle 326 is slidably coupled to main portion 294 through two handle guides 360, 362 extending from the rear surface of the main portion 294. Handle guides 360, 362 can be posts sized to be received in handle guide slots 374, 376 formed in handle 326. An opening 370 is formed in release handle 326 to facilitate grasping of the release handle 326 and, in similar fashion to the first embodiment, is positioned in register to a corresponding opening formed in upper portion 216, FIG. 16, so that the latching mechanism 324 and upper portion 216 may be conveniently accessed for actuating the latching mechanism (as discussed below) and re-positioning of the upper portion 216 relative to seat body 212 without the need for re-gripping.

As mentioned above, the vertically extending columns of teeth 246, 248, 250, 252 define a plurality of recesses 254 configured to receive the rod 258. Teeth 246, 248, 250, 252 are located on each of the left and right sides of slots 224, 226 and define the range of vertical positions for upper portion 216. Thus, when upper portion 216 is lifted up or down, a row of four recesses 254 is provided for retaining bar 258 and upper portion 216 at a vertical height location.

The latching mechanism of the second embodiment includes a cam activated by handle 326, which is slidable up and down the seatback 220 along a channel 256 defined between teeth 250, 252. The release handle 326 includes a head 366 and a stem 368. The stem 368 includes a pair of ramps 262 formed at its lower end 264 and a stop 266 formed above ramps 262, FIG. 20. Upwards motion of the release handle 326 causes the ramps 262 to engage rod 258. As handle 326 is lifted upwards, ramps 262 displace rod 258 rearwardly against the compression springs between rod 258 and inner walls 228a, 230a. After rod 258 is clear of teeth 246, 248, 250, 252, the upper portion 216 may then be freely repositioned to the desired location. Releasing the release handle 326 allows the springs to push the rod 258 back into engagement with the recesses 254 corresponding to the new location for upper portion 216. Thus, the latching mechanism is self-locking.

Figure 21:
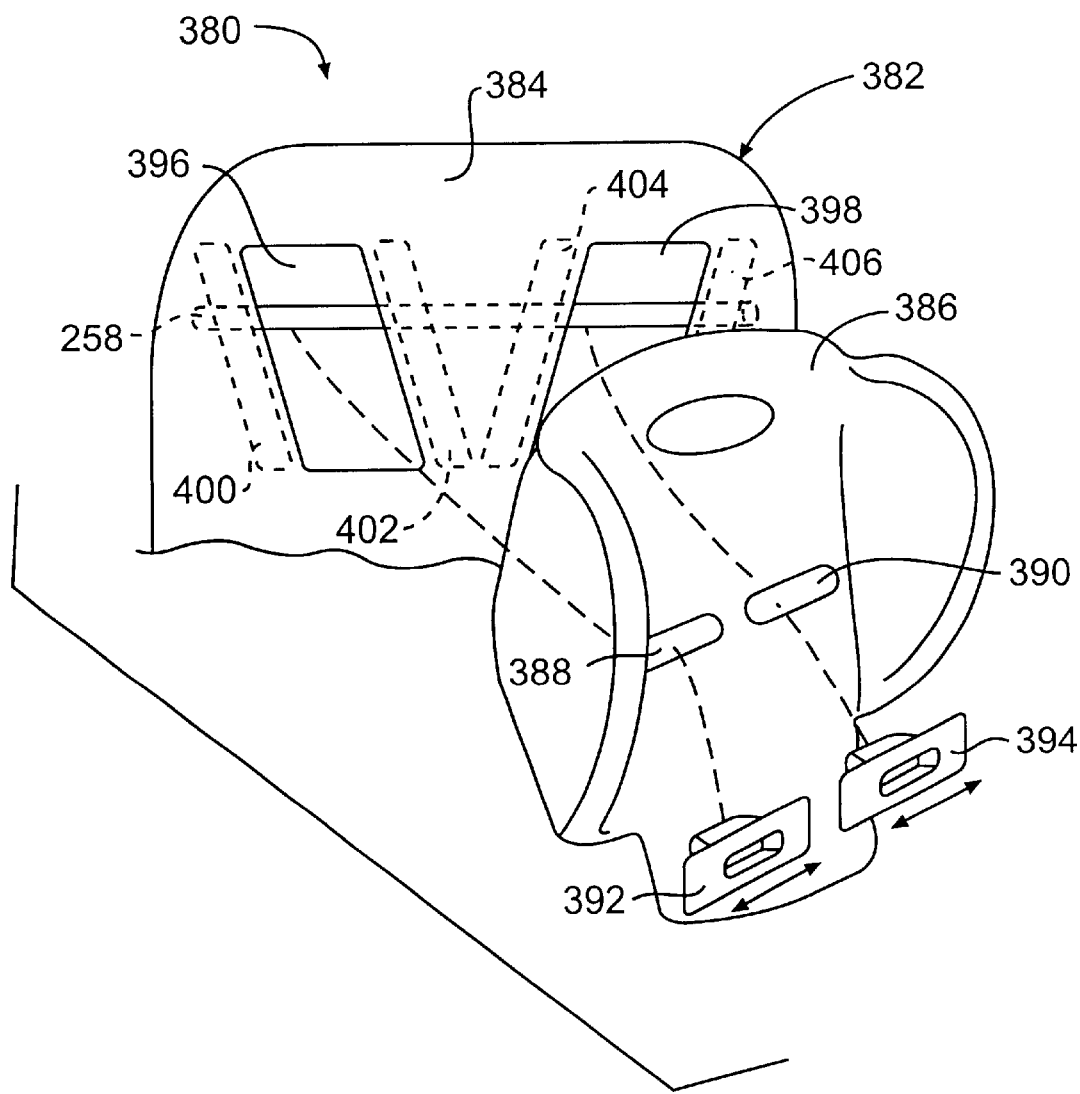
FIG. 21 is an exploded view of a portion a vehicle seat according to a third embodiment of the invention.

FIG. 21 illustrates a third embodiment of the invention. The vehicle seat 380 has a seat body 382 with a seat back 384 and a lower seating portion. An upper portion 386 is adjustably mounted to the seat back 384.

The structure of the upper portion 386 is substantially the same as the upper portion 216 of the second embodiment except that rod loops 228, 230 are not fixed to the upper portion 386. Instead, the upper portion 386 includes two horizontal slots 388, 390 into which sliding rod loops 392, 394 are placed. The sliding rod loops 392, 394 are similar in structure to the rod loops 228, 230 with respect to receiving the steel rod 256 and the harness 218. However, the sliding rod loops 392, 394 are configured to slide toward and away from each other in the respective horizontal slots 388, 390.

The sliding rod loops 392, 394 are coupled to diagonally extending slots 396, 398 in the seat back 384, respectively.

As the upper portion 386 is moved up or down, the diagonally extending slots 396, 398 guide the sliding rod loops 392, 394 away from and toward each other. This provides vertical and horizontal adjustment of the shoulder harnesses 260, 261 simultaneously with the height adjustment of the upper portion 386.

A diagonally extending column of teeth 400, 402, 404, 406 is located on each side of each diagonally extending slot 396, 398. The diagonally extending column of teeth 400, 402, 404, 406 are identical to the vertically extending teeth 246, 248, 250, 252 (FIGS. 17, 18, 20) except for their diagonal orientation. The latching mechanism of the second embodiment can be used with the diagonally extending column of teeth 400, 402, 404, 406 in the same manner as described above to secure the upper portion 386 in the desired location.

Equally, the embodiment of FIGS. 1–15 could be modified to provide height and width adjustment of the left and right shoulder harnesses 60, 61, as just discussed. The upper belt slots 36, 38 could be diagonally oriented, as discussed above, and the harness windows 102, 104 reconfigured as horizontally extending slots. Sliding belt guides similar to the sliding rod loops 392, 394 could be placed in the horizontally extending slots such that they simultaneously engage the diagonally oriented slots in the seatback. Threading the left and right shoulder harnesses 60, 61 through the sliding belt guides would cause the left and right shoulder harnesses 60, 61 to move up and down as the upper portion moves up and down. Simultaneously, the diagonally oriented slots would cause the sliding belt guides to move horizontally within the horizontally extending slots toward and away from each other to adjust the horizontal spacing of the left and right shoulder harnesses 60, 61.

It will be apparent to those skilled in the art that various modifications and variations can be made in the vehicle seat of the present invention without departing from the spirit or scope of the invention. Thus, it is intended that the present invention cover the modifications and variations of this invention provided they come within the scope of the appended claims and their equivalents.

What is claimed is:

1. A vehicle seat for accommodating a range of passenger seating sizes, each of the seating sizes indicating a seated shoulder height for a passenger, said vehicle seat being securable on a seat of a vehicle by one of a vehicle lap belt, vehicle lap and shoulder belt and universal restraint system, the seat of the vehicle having a seat pan and upper seat back, said vehicle seat comprising:
   a seat body including an upper seatback defining an upper seating area disposed between left and right forwardly extending side walls, the upper seating area supporting the upper torso of a seated passenger;
   a body support including left and right sides, each of which including respective left and right surfaces, said left and right sides defining, respectively, left and right side supports for the seated passenger; and
   a cam adjusting said left side support relative to said right side support when said body support is vertically repositioned relative to said seat body, said cam including said left and right surfaces disposed in sliding contact with said seat body.

2. The vehicle seat of claim 1, further including an upper seat portion having an upper end extending above the upper seatback and a lower end coupled to said body support.

3. The adjustable vehicle seat of claim 2, wherein said upper seat portion further includes a headrest.

4. The vehicle seat of claim 3, wherein said left and right side supports provide lateral support to the portion of the seated passenger's upper torso extending approximately from the shoulder to the waist and said headrest further including left and right side wings for providing lateral support to the head of the seated passenger.

5. The vehicle seat of claim 1, wherein soft goods padding covers a portion of said seat body, wherein each of said left and right side supports describe a relatively non-compliant support as compared to the soft goods padding.

6. The vehicle seat of claim 4, said body support further including a center portion integrally formed with, and being connected to said left and right side supports by a hinge.

7. The vehicle seat of claim 6, wherein said hinge is a living hinge.

8. The vehicle seat of claim 1, said body support further including an intermediate portion coupled to said left and right side supports by a hinging portion, wherein when said body support is vertically repositioned, each of said left and right side supports are displaced relative to said intermediate portion.

9. The vehicle seat of claim 8, wherein said hinging portion corresponds to a left and right living hinge coupling said left and right side supports to said intermediate portion.

10. The vehicle seat of claim 1, wherein a side support angle is defined as the angle extending between at least one of said left and right side supports and said upper seating area,
   wherein said cam is operative for reducing and increasing said side support angle when said body support is vertically repositioned and wherein the reducing and increasing of said side support angle adjusts said left and right side supports for the seated passenger.

11. The vehicle seat of claim 10, wherein when said body support is lowered, said side support angle corresponds to a first angle and wherein when said body support is raised, said side support angle corresponds to a second side support angle, wherein said first angle is less than said second angle.

12. The vehicle seat of claim 1, wherein said seat body upper seatback includes a vertically extending guide and wherein said body support is vertically positionable by a positioning device having a first end securable to said body support and a second end coupled to said vertically extending guide.

13. The vehicle seat of claim 12, said vehicle seat being configurable between a forward facing vehicle seat with attached harness and a belt positioning booster seat, wherein said body support is removable from said positioning device when configuring said vehicle seat from the forward facing vehicle seat with attached harness to the belt positioning booster seat.

14. The vehicle seat of claim 12, wherein said vertically extending guide includes a slot formed in the upper seatback, said positioning device is retained in said slot, and wherein when said body support is vertically positioned, said positioning device is displaced along said slot.

15. The vehicle seat of claim 1, wherein said body support further includes a seatback connecting end selectable between one of a fixed body support coupling appropriate for vehicle seat use and a sliding body support coupling for vertically adjusting said body support relative to said seatback.

16. The vehicle seat of claim 15, wherein said seatback connecting end includes:
   a movable portion including an engagement member, and
   a fixed portion secured to the upper seatback and including a plurality of engagement positions for receiving said engagement member when said body support is svertically adjusted from a first height to a second height,
   wherein said fixed body support coupling corresponds to said engagement member being engaged with one of said plurality of engagement positions and said sliding body support coupling corresponds to said engagement member being clear of said plurality of engagement positions.

17. A vehicle seat for accommodating a range of passenger seating sizes, each of the seating sizes indicating a seated shoulder height for a passenger, said vehicle seat being securable on a seat of a vehicle by one of a vehicle lap belt, vehicle lap and shoulder belt and universal restraint system, the seat of the vehicle having a seat pan and upper seat back, said vehicle seat comprising:

a seat body including an upper seatback defining an upper seating area disposed between left and right forwardly extending side walls, the upper seating area supporting the upper torso of a seated passenger;

a body support including left and right sides, said left and right sides defining, respectively, left and right side supports for the seated passenger; and a cam adjusting said left side support relative to said right side support when said body support is vertically repositioned relative to said seat body;

wherein said cam comprises a side wall surface on each of said left and right side walls and a rearwardly extending protrusion on each of said left and right side supports, wherein the left and right side wall surfaces describe a downwardly converging pair of wall surfaces and each of the rearwardly extending protrusions having a surface positioned in sliding contact with the respective left and right side wall surfaces of said seat body.

18. A method for configuring a vehicle seat from a belt positioning booster seat mode appropriate for restraining an occupant of a first size in a vehicle seat, to an attached harness seat mode appropriate for restraining an occupant of a second size in a vehicle seat, wherein the second size is smaller than the first size, the vehicle seat including a seat body having an upper seating area disposed between left and right side walls, the left and right side walls providing lateral support appropriate for the first size occupant, an occupant harness securable to said seat body, and a body support including left and right lateral support surfaces for providing lateral support for the second size occupant, said method for configuring a vehicle seat from a belt positioning booster seat mode to an attached harness seat mode comprising the steps of:

securing the occupant harness to the seat body;
connecting the body support to the seat body;
seating the occupant in the vehicle seat; and
adjusting the left lateral support surface relative to the right lateral support surface to within a range appropriate for the second size occupant by vertically adjusting the body support relative to the seat body.

19. The method of claim 18, the body support including a connecting end connecting the body support to the seat body, the connecting end including a release for configuring from a fixed body support coupling to a sliding body support coupling relative to the seat body, wherein said vertically adjusting the body support step includes reconfiguring the connecting end from the fixed body support coupling to the sliding body support coupling by actuation of the release.

20. An adjustable vehicle seat for accommodating seated passengers of various seating sizes, said adjustable vehicle seat adapted for receiving a passenger harness, said vehicle seat comprising:

a seat body including a lower seating portion describing a horizontally extending seating portion and an upstanding seatback describing a vertically extending seating portion, the seatback including a seating side extending laterally between left and right sides, and a rear face located rearwardly of the seating side;

an upper seat portion having upper and lower ends and including a headrest;

a coupling assembly configurable between a fixed coupling fixing said upper seat portion relative to said seat body and a movable coupling permitting vertical adjustment of said upper seat portion relative to said seat body, said coupling assembly including:

a first connector disposed on said upper seat portion, a second connector disposed on the seatback for engaging said first connector, wherein when said second connector is engaged with said first connector said coupling assembly is configured as said fixed coupling, a cam for displacing one of said first connector and said second connector relative to the other of said first connector and said second connector so as to configure said coupling assembly from said fixed coupling to said movable coupling, and an actuator coupled to the upper seat portion to engage the cam by sliding the actuator along the upper seat portion, such that the cam displaces the one of the first and second connectors.

21. The adjustable vehicle seat of claim 20, wherein said cam displaces said first connector relative to said second connector and wherein said actuator is an elongate handle having a first proximal end located adjacent said upper seat portion upper end and a second distal end coupled to said first connector.

22. The adjustable vehicle seat of claim 20, wherein said first connector is an elongate bar receivable in said second connector and wherein said cam comprises a sloped surface formed on said cam actuator and positioned in operative proximity to said elongate bar.

23. The adjustable vehicle seat of claim 20, said upper seat portion further including a harness adjuster for repositioning the passenger harness according to the seating height of a passenger placed in said vehicle seat.

24. The adjustable vehicle seat of claim 23, wherein said vehicle seat is a child's seat receivable in an adult seat and the passenger harness is a vehicle supplied passenger shoulder belt, said harness adjuster further including:

a belt guide formed on said headrest, said belt guide adapted for receiving the vehicle supplied shoulder belt, said belt guide being vertically repositionable when said coupling assembly is configured as said movable coupling.

25. The adjustable vehicle seat of claim 23, wherein said vehicle seat is a child's seat receivable in an adult seat and the passenger harness is an attached child harness having first and second webbings, the first webbing being securable to the lower seating portion and the second webbing having left and right ends corresponding to left and right shoulder restraints, said harness adjuster further including:

an elongate bar receiving the left and right ends of the second webbing, said elongate bar being vertically repositionable when said coupling assembly is configured as said movable coupling.

26. The adjustable vehicle seat of claim 25, wherein said first connector corresponds to said elongate bar.

27. The adjustable vehicle seat of claim 26, wherein said vehicle seat is a child's seat receivable in an adult seat and the passenger harness is an attached child harness, the first webbing being securable to the lower seating portion and the second webbing having left and right ends corresponding to left and right shoulder restraints, said harness adjuster further including:

a left and right webbing guide receiving the left and right ends of the second webbing, said webbing guide being vertically repositionable when said coupling assembly is configured as said movable coupling.

28. The adjustable vehicle seat of claim 20, wherein said seat body is a unitary seat body of a child restraint system adapted for being secured in a vehicle passenger seat having a lower seat pan and upper seatback, and said lower seating portion including a lower seating area and a lower rear surface opposite the lower seating area,
   wherein when said vehicle seat is secured in the vehicle seat, the lower rear surface is flush with the vehicle seat pan and the upper rear surface is flush with the vehicle upper seatback.

29. The adjustable vehicle seat of claim 28, wherein said unitary seat body further includes right and left apertures formed in the upper seatback defining a belt pathway for receiving one of a vehicle lap belt, a vehicle lap and shoulder belt, and a universal vehicle seat restraint.

30. The adjustable vehicle seat of claim 20, wherein said cam is disposed on said upper seat portion.

31. An adjustable vehicle seat for accommodating seated passengers of various seating sizes, said adjustable vehicle seat adapted for receiving a passenger harness, said vehicle seat comprising:
   a seat body including a lower seating portion describing a horizontally extending seating portion and an upstanding seatback describing a vertically extending seating portion, the seatback including a seating side extending laterally between left and right sides, and a rear face located rearwardly of the seating side;
   an upper seat portion having upper and lower ends and including a headrest;
   a coupling assembly configurable between a fixed coupling fixing said upper seat portion relative to said seat body and a movable coupling permitting vertical adjustment of said upper seat portion relative to said seat body, said coupling assembly including:
      a first connector disposed on said upper seat portion,
      a second connector disposed on the seatback for engaging said first connector, wherein when said second connector is engaged with said first connector said coupling assembly is configured as said fixed coupling,
   a cam for displacing one of said first connector and said second connector relative to the other of said first connector and said second connector so as to configure said coupling assembly from said fixed coupling to said movable coupling,
   said coupling assembly further including a cam actuator for actuating said cam,
   wherein said cam comprises an outwardly extending guide post formed on the first connector and an angularly extending groove formed in the cam actuator for receiving the first connector guide post.

32. An adjustable vehicle seat for accommodating seated passengers of various seating sizes, said adjustable vehicle seat adapted for receiving a passenger harness, said vehicle seat comprising:
   a seat body including a lower seating portion describing a horizontally extending seating portion and an upstanding seatback describing a vertically extending seating portion, the seatback including a seating side extending laterally between left and right sides, and a rear face located rearwardly of the seating side;
   an upper seat portion having upper and lower ends and including a headrest;
   a coupling assembly configurable between a fixed coupling fixing said upper seat portion relative to said seat body and a movable coupling permitting vertical adjustment of said upper seat portion relative to said seat body, said coupling assembly including:
      a first connector disposed on said upper seat portion,
      a second connector disposed on the seatback for engaging said first connector, wherein when said second connector is engaged with said first connector said coupling assembly is configured as said fixed coupling, and
   a cam for displacing one of said first connector and said second connector relative to the other of said first connector and said second connector so as to configure said coupling assembly from said fixed coupling to said movable coupling,
   said coupling assembly further including a cam actuator coupled to said upper seat portion to permit vertical sliding motion of said cam actuator relative to said upper seat portion,
   wherein vertical displacement of said cam actuator causes horizontal displacement of said first connector relative to said second connector.

33. The adjustable vehicle seat of claim 32, said first connector further including a spring biasing said first connector into engagement with said second connector.

34. A vehicle seat, comprising:
   a seat body including a lower seating portion and an upstanding seatback;
   an upper seat portion including a headrest; and
   means for securing said upper seat portion to said upstanding seatback permitting adjustment of the distance between the headrest and the lower seating portion, wherein said securing means comprises:
      a connector disposed on said upper seat portion, said connector including a guide post and being laterally re-positionable relative to said upper seat portion;
      a first and second pair of laterally extending teeth disposed on the seatback for engaging said connector, said first and second pair of teeth defining, respectively, a first and second headrest position wherein when said upper seat portion is positioned at one of said first and second headrest positions, said connector is engaged with the corresponding one of said first and second pair of teeth so as to provide a mechanical interlock between said upper seat portion and said upstanding seatback;
      a vertically extending cam actuator slidingly coupled to said headrest, said cam actuator having a lower end;
      a cam comprising an outwardly extending guide post formed on said connector and an angularly extending groove formed on said cam actuator lower end for receiving said first connector guide post, wherein said angularly extending groove is positioned in sliding contact with said connector guide post for laterally displacing said connector in response to vertical displacement of said cam actuator relative to said headrest; and
      a spring positioned between said cam actuator and said connector, said spring urging said connector into engagement with one of said first and second pair of teeth;
   wherein when said upper seat portion is to be positioned from said first headrest position to said second headrest position, said cam actuator is displaced upwardly, thereby releasing said connector from said first pair of teeth so as to permit adjustment of the distance between the headrest and the lower seating portion and wherein when said cam actuator is released, said spring pulls said cam actuator downwardly to cause said connector to engage with said second pair of teeth, thereby re-establishing the mechanical interlock between said upper seat portion and said upstanding seatback.

35. An adjustable vehicle seat restraint configurable between a first seating height and a second seating height, the adjustable vehicle seat being adapted for receiving a restraining harness for restraining a passenger seated in said adjustable vehicle seat, said adjustable vehicle seat comprising:

a seat body including a lower seating portion and an upstanding seatback extending upwardly in a vertical direction, the seatback including a seating side and rear face opposite the seating side;

an upper seat portion coupled to said seatback and including a headrest wherein said headrest is vertically repositionable between the first seating height and the second seating height;

a lateral support coupled to said upper seat portion for providing lateral support to the seat occupant, said lateral support being rotatable about a lateral support axis wherein when said headrest is repositioned from said first seating height to said second seating height, said lateral support rotates about said lateral support axis so as to configure said lateral support from a first lateral support configuration to a second lateral support configuration by sliding contact along the seat body.

36. The adjustable vehicle seat of claim 35, wherein the restraining harness is an attached harness including a pair of left and right shoulder belts having left and right ends, said upper seat portion further including a harness guide receiving the left and right shoulder belt ends, wherein the left and right shoulder belts are repositionable between said first seating height and said second seating height by vertically repositioning said harness guide.

37. A seat for use in a vehicle having a shoulder belt, comprising:

a seat back and a seat bottom connected to the seat back;

an adjustable body support vertically movable along the seat back; and a harness guide movable with said adjustable body support between a plurality of vertical harness positions;

wherein said seat is configurable between an attached harness seat configuration and booster seat configuration, said attached harness seat configuration including a harness removably secured to at least one of said seat back and said seat bottom, said harness including a webbing removably received by said harness guide, wherein said webbing is simultaneously adjustable with said adjustable body support between said plurality of vertical harness positions, and said booster seat configuration is devoid of said harness and includes a shoulder belt guide for removably receiving the shoulder belt of the vehicle, said shoulder belt guide being vertically movable with said adjustable body support between a plurality of vertical belt positions, wherein the shoulder belt is simultaneously adjustable with said adjustable body support to one of said vertical belt positions when received in said shoulder belt guide.

38. The seat of claim 37, further comprising:

two side supports connected to said adjustable support, wherein one of said side supports is movable relative to the other of said side supports, and wherein said side supports move simultaneously with said adjustable body support and relative to each other by sliding contact along the seat back.

39. The seat of claim 37, further comprising a coupling between said seat back and said adjustable body support to selectively secure said adjustable body support in one of a plurality of discrete vertical positions, said coupling including:

a stationary member associated with one of said seat back and said adjustable body support, said stationary member defining said plurality of discrete vertical positions;

a movable engagement member associated with the other of the seat back and said adjustable body support, wherein said coupling secures said adjustable body support in one of said plurality of discrete positions when said movable engagement member engages said stationary member;

a cam mounted on one of said movable engagement member and said stationary member and engaging the other of said movable engagement member and said stationary member, wherein actuation of said cam disengages said movable engagement member from said stationary member to permit movement of said adjustable body support between said discrete vertical positions.

* * * * *